(12) United States Patent
Christensen

(10) Patent No.: US 6,493,002 B1
(45) Date of Patent: *Dec. 10, 2002

(54) METHOD AND APPARATUS FOR DISPLAYING AND ACCESSING CONTROL AND STATUS INFORMATION IN A COMPUTER SYSTEM

(75) Inventor: Steven W. Christensen, Milpitas, CA (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/821,004

(22) Filed: Mar. 20, 1997

Related U.S. Application Data

(63) Continuation of application No. 08/316,237, filed on Sep. 30, 1994, now abandoned.

(51) Int. Cl.[7] .................................................. G06F 3/00
(52) U.S. Cl. ....................................... 345/779; 345/772
(58) Field of Search ................................ 395/345, 350, 395/352, 354, 326, 339, 340, 341, 973, 974; 345/348, 350, 352, 354, 326, 339, 340, 341, 973, 974, 700, 764, 771–772, 776–779, 781, 784, 788, 791, 798–800, 833, 856

(56) References Cited

U.S. PATENT DOCUMENTS

| | | | |
|---|---|---|---|
| 4,862,389 A | * | 8/1989 | Takagi .......................... 345/794 |
| 4,885,704 A | * | 12/1989 | Takagi et al. ................. 345/166 |
| 4,896,291 A | * | 1/1990 | Gest et al. .................... 345/841 |
| 4,931,957 A | * | 6/1990 | Takagi et al. ................. 345/453 |
| 5,091,866 A | * | 2/1992 | Takagi .......................... 345/803 |
| 5,146,556 A |   | 9/1992 | Hullot et al. ................. 345/790 |
| 5,202,961 A | * | 4/1993 | Mills et al. ................... 345/720 |
| 5,416,895 A |   | 5/1995 | Anderson et al. ............ 707/503 |
| 5,428,730 A | * | 6/1995 | Baker et al. .................. 345/740 |
| 5,588,105 A | * | 12/1996 | Foster et al. ................. 345/779 |
| 5,617,526 A | * | 4/1997 | Oran et al. ................... 345/779 |
| 5,640,498 A | * | 6/1997 | Chew ........................... 345/790 |
| 5,644,334 A | * | 7/1997 | Jones et al. .................. 345/419 |
| 5,659,693 A | * | 8/1997 | Hansen et al. ............... 345/779 |
| 5,678,034 A | * | 10/1997 | Chew ........................... 345/520 |
| 5,757,371 A | * | 5/1998 | Oran et al. ................... 345/779 |
| 5,825,357 A | * | 10/1998 | Malamud et al. ............ 345/779 |
| 6,133,898 A |   | 10/2000 | Ludolph et al. ............. 345/790 |

FOREIGN PATENT DOCUMENTS

| | | |
|---|---|---|
| EP | 0 483 777 A2 | 10/1991 |
| EP | 483777 A | 5/1992 |
| EP | 0 584 391 A1 | 8/1992 |
| EP | 584392 A | 3/1994 |

OTHER PUBLICATIONS

EPO 0 584 392 A1, Cohausz, English Translation of the German patent document, Mar. 1992.*
"PCT Written Opinion", Oct. 4, 1996.
Steven Harris, et al.: "Inside WordPerfect 6 for Windows", 1994, USA, pp. 1104–1108.
Mark A. Benge, Matt Smith: "Designing Custom Controls", Spring 1993, USA, pp. 72–85.
International Search Report, PCT/US 95/11025, Jan. 03, 1996.

* cited by examiner

*Primary Examiner*—Crescelle N. dela Torre
(74) *Attorney, Agent, or Firm*—Blakely, Sokoloff, Taylor & Zafman LLP

(57) ABSTRACT

An interactive computer-controlled display system having a processor, a data display screen, a cursor control device for interactively positioning a cursor on the data display screen, and a window generator that generates and displays a window on a data display screen. The window region provides status and control information in one or more data display areas. The individiual data display areas may be controlled through the use of controls and indicators on the control strip itself using cursor control keys.

50 Claims, 13 Drawing Sheets

METHOD AND APPARATUS FOR DISPLAYING AND ACCESSING CONTROL AND STATUS INFORMATION IN A COMPUTER SYSTEM

This is a continuation of application Ser. No. 08/316,237, filed Sep. 30, 1994, now abandoned.

FIELD OF THE INVENTION

The present invention relates to the field of computer systems; particularly, the present invention relates to displaying a status and control function bar or window to enable access of user selected indicia to a computer system user.

BACKGROUND OF THE INVENTION

Typically, a computer system contains a processor, a bus, and other peripheral devices. The processor is responsible for executing instructions using the data in the computer system. The bus is used by the processor and the peripheral devices for transferring information between one another. The information on the bus usually includes data, address and control signals. The peripheral devices comprise storage devices, input/output (I/O) devices, etc.

Computer systems also include information management systems that coordinate the display of information to the user. Currently, the art in computer display management provides the capability of displaying data in rectangular portions (commonly referred to as windows) of a display screen. Such information management systems include the Finder™ interface of the computer systems manufactured by Apple Computer, Inc. of Cupertino, Calif. Controls are typically provided to resize and move windows within the confines of the physical display boundaries.

Windows may be used to display information regarding application programs, as well as information produced by system programs, that are run on the computer system. Many of these system and control programs provide status and control information and functionality. Some of the system control programs also provide options with respect to the information they provide and the functions they perform. These options can be accessed and/or selected by moving a cursor at a predetermined point in the window and "clicking" a mouse or performing requisite key strokes. Access to these programs may require locating the program (e.g., locating and entering a folder) before execution. The time necessary to access such programs may be unduly long. It is desirable to provide a less obtrusive manner of accessing such system and control programs.

The computer system is often capable of displaying multiple windows or data areas on the display screen at the same time. Windows may overlap each other. The information contained in the portion of the window that is overlapped is not visible. The window that is entirely visible to the computer user is typically the active window. Therefore, a program, such as a system or control program may be running, while another program displaying information in another window is selected as active and thereafter covers, partially or completely, the windows or data areas displayed by the system/control program. Sometimes the user may wish to have an unobstructed view of the system/control data area, regardless of the window selected as active (even when the windows overlap each other). Thus, it is desirable at times to have windows that are always visible to the user. However, it is also desirable to be able to eliminate that window at times based on the user's requirements.

The present invention overcomes these problems by providing a status and control information display. The display of the present invention is in an easily accessible format. Also, the display may be configured to permanently display in a visible manner control and status indicia.

SUMMARY OF THE INVENTION

An interactive computer-controlled display system is described. In the present invention, the display system includes a processor, a data display screen, and a cursor control device for interactively positioning a cursor on the data display screen. The present invention also includes a window generator that generates and displays a window (e.g., a control strip) on a data display screen. In one embodiment, the window comprises a control and/or status window for display on the desktop of the computer system The window displays graphics depicting at least one display area of indicia. The individual data areas may be controlled through the use of controls and indicators in the window itself using cursor control keys.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
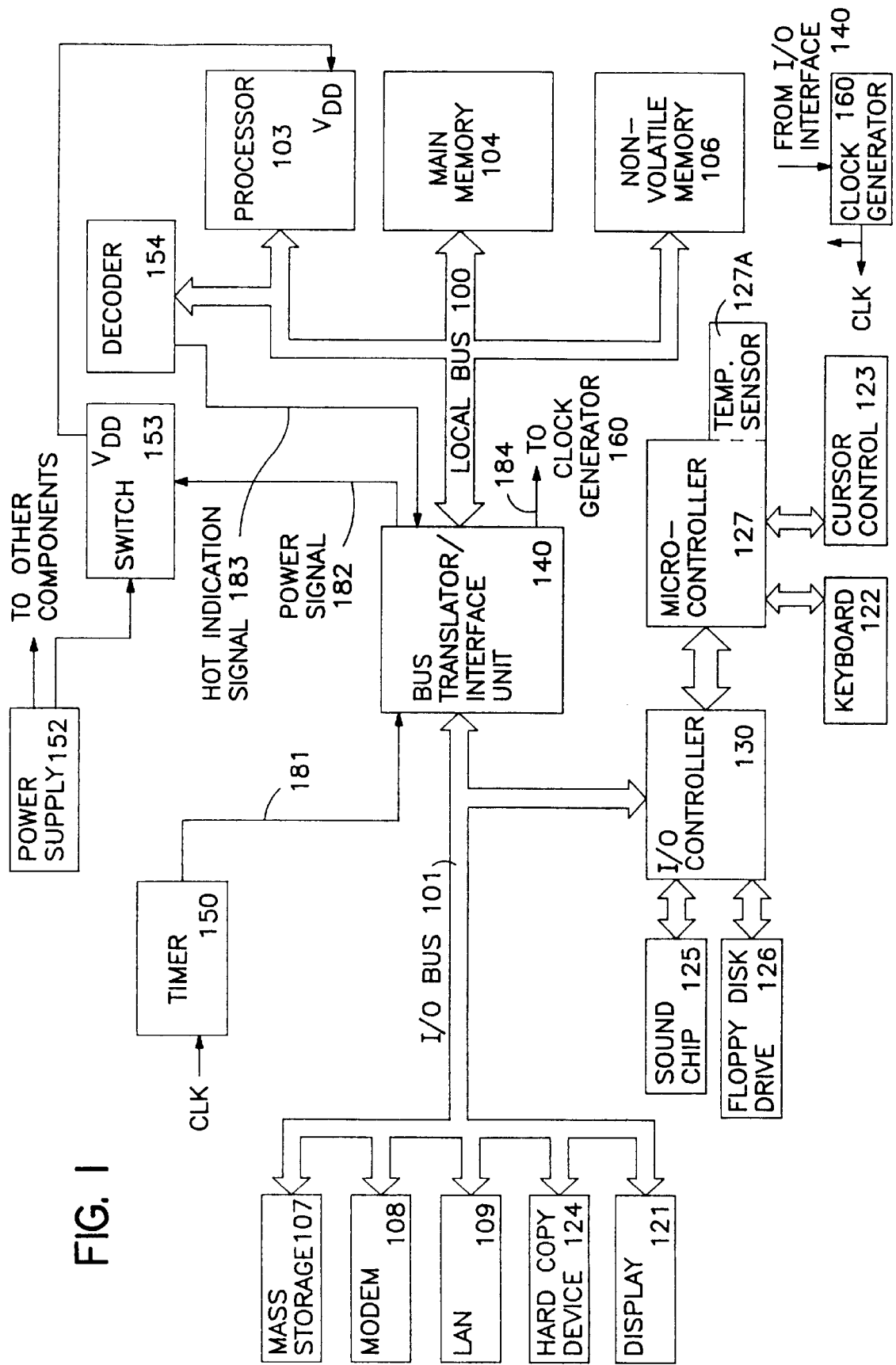
FIG. 1 is a block diagram of one embodiment of the computer system of the present invention.

A method and apparatus for providing status and control indicia. In the following detailed description of the present invention numerous specific details are set forth, such as types of status indicia, instruction names, etc., in order to provide a thorough understanding of the present invention. However, it will be apparent to one skilled in the art that the present invention may be practiced without these specific details. In other instances, well-known structures and devices are shown in black diagram form, rather than in detail, in order to avoid obscuring the preset invention.

The present description includes material protected by copyrights, such as illustrations of graphical user interface images which the assignee of the present invention owns. The assignee hereby reserves its rights, including copyright, in these materials, and each such material should be regarded as bearing the following notice: Copyright Apple Computer, Inc., 1993. The copyright owner has no objection to the facsimile reproduction by anyone of the patent document or the patent disclosure, as it appears in the Patent and Trademark Office file or records, but otherwise reserves all copyrights whatsoever.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

OVERVIEW OF THE COMPUTER SYSTEM OF THE PRESENT INVENTION

Referring to FIG. 1, an overview of a computer system of the present invention is shown in block diagram form. The present invention may be implemented on a general purpose microcomputer, such as one of the members of the Apple family of personal computers, one of the members of the IBM personal computer family, or one of several other computing and assistant devices which are presently commercially available. Of course, the present invention may also be implemented on a multi-user system while encountering all of the costs, speed, and function advantages and disadvantages available with these machines. The preferred embodiment of the present invention is implemented on an Apple PowerBook™ computer system developed by the assignee of the present invention.

As illustrated in FIG. 1, the computer system of the present invention generally comprises a local bus or other communication means 100 for communicating information, a processor 103 coupled with local bus 100 for processing information, a random access memory (RAM) or other dynamic storage device 104 (commonly referred to as a main memory) coupled with local bus 100 for storing information and instructions for processor 103, and a read-only memory (ROM) or other non-volatile storage device 106 coupled with local bus 100 for storing non-volatile information and instructions for processor 103.

The computer system of the present invention also includes an input/output (I/O) bus or other communication means 101 for communication information in the computer system. A data storage device 107, such as a magnetic tape and disk drive, including its associated controller circuitry, is coupled to I/O bus 101 for storing information and instructions. A display device 121, such as a cathode ray tube, liquid crystal display, etc., including its associated controller circuitry, is also coupled to I/O bus 101 for displaying information to the computer user, as well as a hard copy device 124, such as a plotter or printer, including its associated controller circuitry for providing a visual representation of the computer images. Hard copy device 124 is coupled with processor 103, main memory 104, non-volatile memory 106 and mass storage device 107 through I/O bus 101 and bus translator/interface unit 140. A modem 108 and an ethernet local area network 109 are also coupled to I/O bus 101.

Bus interface unit 140 is coupled to local bus 100 and I/O bus 101 and acts as a gateway between processor 103 and the I/O subsystem. Bus interface unit 140 may also provide translation between signals being sent from units on one of the buses to units on the other bus to allow local bus 100 and I/O bus 101 to co-operate as a single bus.

An I/O controller 130 is coupled to I/O bus 101 and controls access to certain I/O peripherals in the computer system. For instance, I/O controller 130 is coupled to controller device 127 that controls access to an alpha-numeric input device 122 including alpha-numeric and other keys, etc., for communicating information and command selections to processor 103, a cursor control 123, such as a trackball, stylus, mouse, or trackpad, etc., for controlling cursor movement, and a temperature sensor 127A for measuring the internal system temperature. The system also includes a sound chip 125 coupled to I/O controller 130 for providing audio recording and play back. Sound chip 125 may include a sound circuit and its driver which are used to generate various audio signals from the computer system. I/O controller 130 may also provide access to a floppy disk and driver 126. The processor 103 controls I/O controller 130 with its peripherals by sending commands to I/O controller 130 via local bus 100, interface unit 140 and I/O bus 101.

Batteries or other power supply 152 may also be included to provide power necessary to run the various peripherals and integrated circuits in the computer system. Power supply 152 is typically a DC power source that provides a constant DC power to various units, particularly processor 103. Various units such as processor 103, display 121, etc., also receive clocking signals to synchronize operations within the computer systems. These clocking signals may be provided by a global clock generator or multiple clock generators, each dedicated to a portion of the computer system. Such a clock generator is shown as clock generator 160. In one embodiment, clock generator 160 comprise a phase-locked loop (PLL) that provides clocking signals to processor 103.

In one embodiment, processor 103 is a member of the 68000 family of processors, such as the 68040 processor manufactured by Motorola Corporation of Schaumberg, Ill. The memory in the computer system is initialized to store the operating system as well as other programs, such as file directory routines, control programs, system programs and application programs, and data inputted from I/O controller 130. The operating system running on processor 103 takes care of basic tasks such as starting the system, handling interrupts, moving data to and from memory 104 and peripheral devices via input/output interface unit 140, and managing the memory space in memory 104. In one embodiment, the operating system is stored in ROM 106, while RAM 104 is utilized as the internal memory for the computer system for accessing data and application programs.

Processor 103 accesses memory in the computer system via an address bus within bus 100. Commands in connection with the operation of memory in the computer system are also sent from the processor to the memory using bus 100. Bus 100 also includes a bi-directional data bus to communicate data in response to the commands provided by processor 103 under the control of the operating system running on it.

Of course, certain implementations and uses of the present invention may neither require nor include all of the above components. For example, in certain implementations a keyboard or cursor control device for inputting information to the system may not be required. Furthermore, the computer system may include additional processing units.

OVERVIEW OF THE PRESENT INVENTION

Figure 2A:
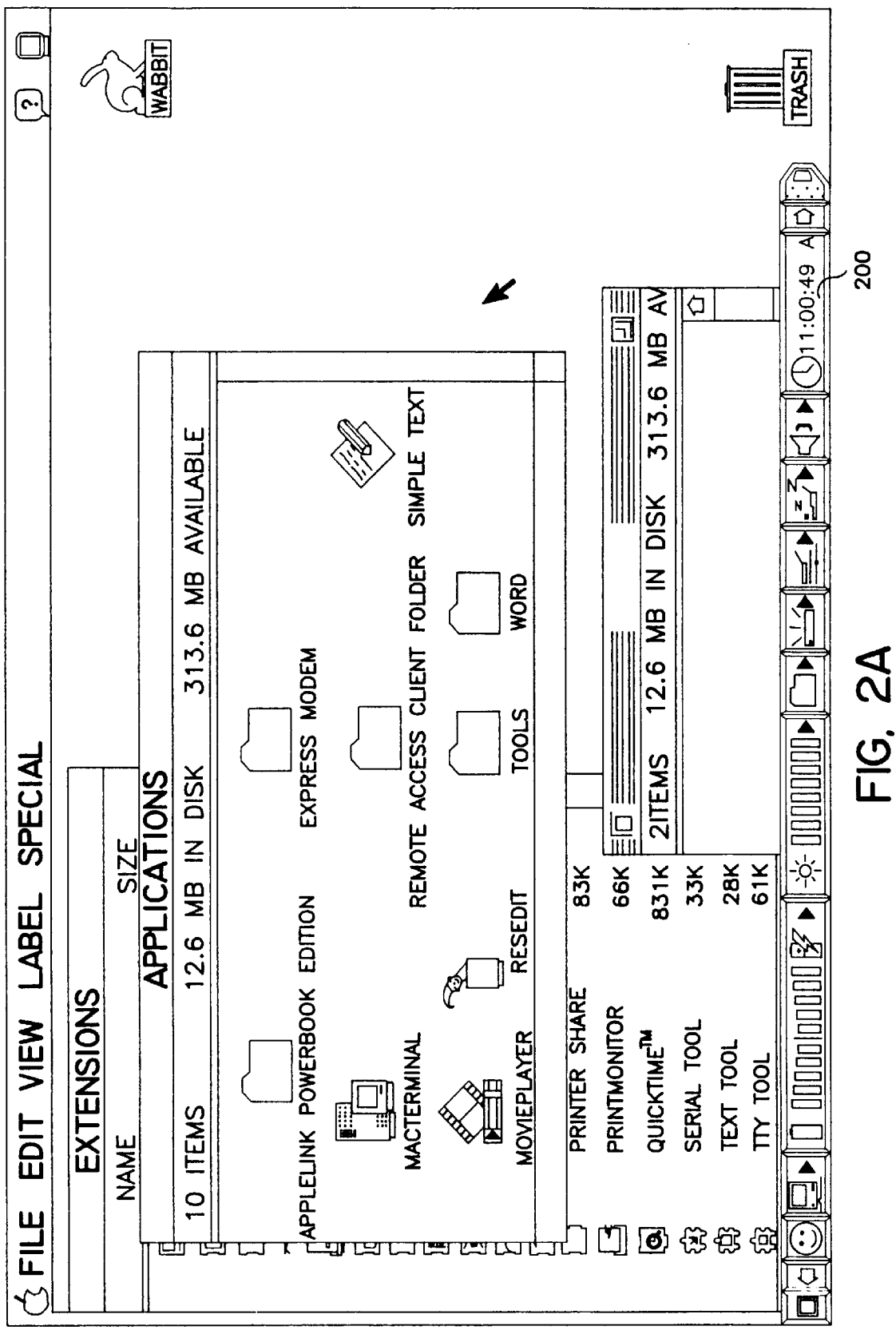
FIG. 2A displays a computer desktop illustrating the control strip of the present invention as well as opened windows.
Figure 2B:
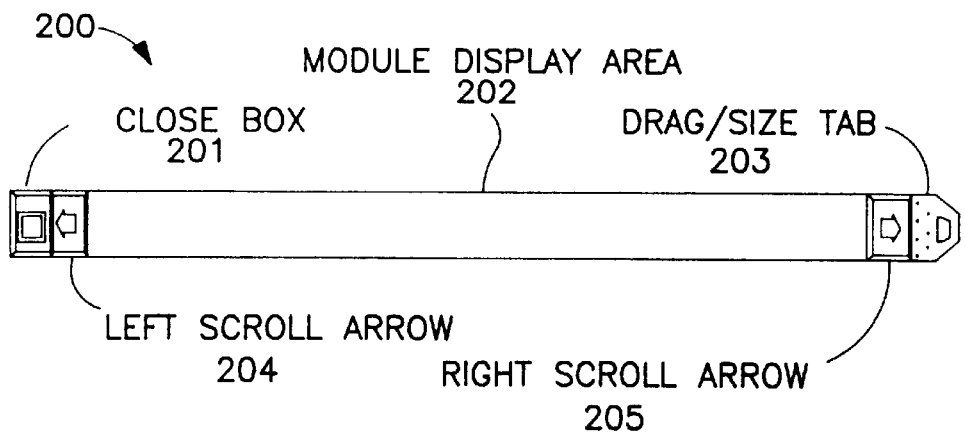
FIG. 2B illustrates one embodiment of the control strip of the present invention.

The present invention provides a control and/or status window for display on the desktop of the computer system. The control and status window will be referred to herein as the control strip. The control strip of the present invention is a window of graphics depicting one or more display areas for control and/or status indicia. In one embodiment, each of the display areas is individually and variably sized. The size of the control strip itself may also be variably sized. In one embodiment, the size may be adjusted such that none, all, or only a portion of the display areas within its boundaries are visible. The size of the control strip may also be varied such that only a portion of one display area is visible in the control strip. FIG. 2A displays a computer desktop illustrating the control strip of the present invention as well as opened windows. FIG. 2B illustrates one embodiment of the control strip of the present invention.

Figure 2C:
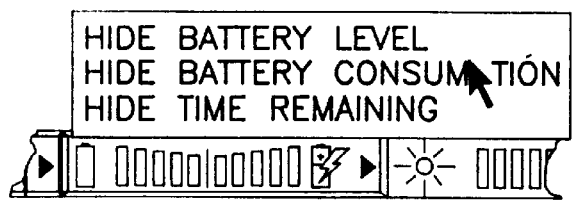
FIG. 2C illustrates a pop-up menu displayed from the control strip of the present invention.
Figure 2D:
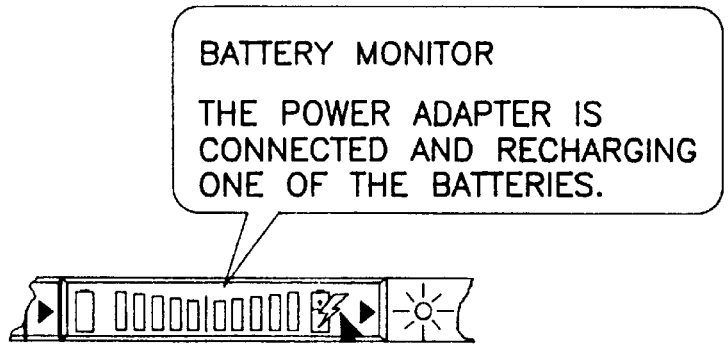
FIG. 2D illustrates a help balloon displayed from the control strip of the present invention.

Each of the variably sized data areas may be sensitive to user input for control. That is, a user may interact with the individually display data areas. Different parts of the control strip either display information or act as buttons, or both. Note that buttons may display information on their surface. When the user clicks a button, it is highlighted. In one embodiment, buttons may also display additional elements such as pop-up menus (shown in FIG. 2C) or help messages (e.g., balloons shown in FIG. 2D). Thus, in one embodiment, control of the individual data areas is accomplished, in part, through the use of small button controls and indicators in the form of various icons.

Each of the display areas is associated with a programming module. Each of the modules provides a specific status or control function. In one embodiment, the module is represented by a disk file containing the code necessary for the module to interact with the control strip as well as other elements such as text, icons, pictures, etc. Modules may be designed to be responsive to selection from cursors via a mouse, trackpad, or cursor control keys, such as on a keyboard. Many of the modules are able to provide control to various system functionality, and may provide menus to do the same.

The control strip is a control panel that provides the operating environment for control strip modules. In one embodiment, the control strip runs on any Macintosh™ computer using a System 7.0 or later operating system. The control strip of the present invention may be designed to run on computer systems using other operating systems.

In one embodiment, the control strip is implemented in a private window layer that appears in front of the windows of all the application layers. That is, the control strip window appears on top of all application programming windows that may be generated as part of the execution of an application program. This prevents other windows from obscuring it. In one embodiment, processing logic in the computer system may maintain a list of windows ordered from the frontmost window on the screen being at the top of the list and the bottommost window being at the bottom of the list. Processing logic can maintain the control strip window at the top of the list.

The control strip of the present invention may include windowing configurations that are shown as being horizontal or vertical on the screen. Furthermore, the present invention is not limited to a single row or column of status and control data areas. In other words, multiple rows and columns of module data areas may be included in the window of the control strip.

CONTROL STRIP MANIPULATION

The control strip, such as shown in FIG. 2B, may also be moved to different portions of the display screen. However, in one embodiment, the window for the control strip may be moved to any location on the display as long as the right and/or left edge of the strip is attached to the right or left edge, respectively, of the display. The user may also hold down the option key and drag the tab 203 of the control strip 200 with the use of a cursor control device (e.g., trackpad, trackball, mouse) to move the control strip to a new position on the display.

In one embodiment, the user may adjust the size of the control strip window. Adjustments to the size of the window may comprise either an increase in the height of the window, the width of the window, or both. In one embodiment, only the width of the control strip window may altered. The definition and use of windows is well-known in the art. In one embodiment, the control strip 200 has a tab 203 on its unattached end. The user can drag tab 203 to adjust the length of the strip. By "clicking" on tab 203, i.e. selection through the use of the trackpad, mouse, cursor control keys, etc., the user is able to shift from a minimal control strip size to a maximum control strip size, and vice versa. In its minimal size, the graphics of the modules in the control strip are not visible and only the tab is showing. In its maximum size, all of the modules in the control strip are showing. Recognizing cursor controlled selections through the use of trackpad, trackball, mouse, cursor control keys, etc., as well as the tracking of movements of the cursor made by the same are well-known in the art.

Scroll arrows, such as left scroll arrow 204 and right scroll arrow 205, are provided on the control strip that enable the window of the control strip to be scrolled to the left or right, respectively. Use of scroll arrows with windows is well-known in the art.

Figure 2E:
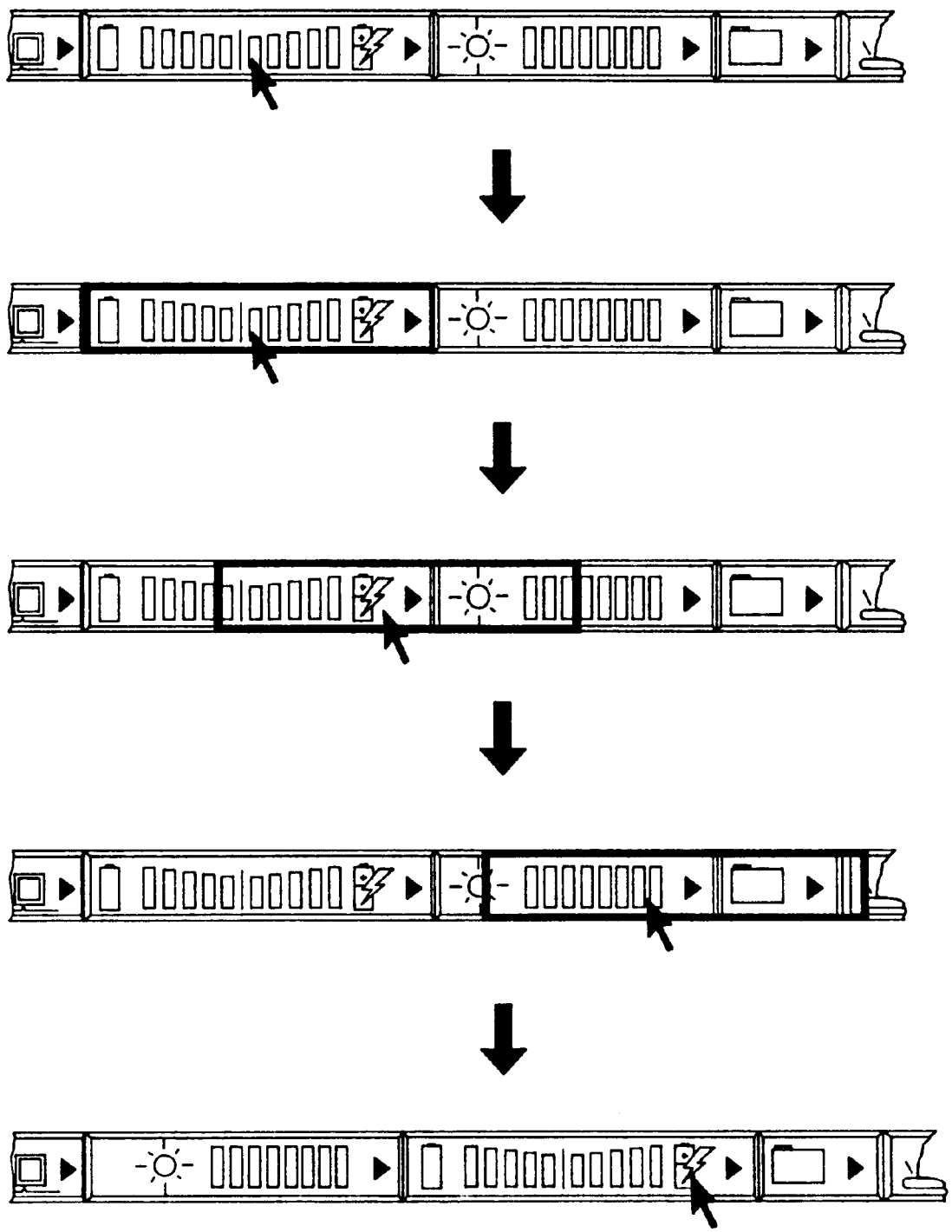
FIG. 2E illustrates the process of moving a display area from one position to another in the control strip.

The user may also hide the control strip. In one embodiment, to make the control strip disappear completely, the user can click the Hide button in the control strip control panel, as described later in conjunction with FIG. 3. A close box 201 is also included in control strip 200 In one embodiment, by holding the option key and clicking a display area, the user can drag the display area to another position in the control strip. An example of the process of moving one display area to another position on the control strip is shown in FIG. 2E. Referring to FIG. 2E, the user selects one of the display areas by, for instance, positioning the cursor over the display area. When the user "clicks" the display area, its border becomes highlighted. While clicking, the display area is dragged to another location in the control strip module display area. When the user has moved the display area to the location of his choice, the user stops "clicking" The control strip display areas are then rearranged.

After the user rearranges the parts of the control strip, the new arrangement is saved. The saving operation may be deferred until resources, such as the hard disk is ready (e.g., spinning) or until just before the computer system is shut down or restarted. In other words, in computer systems in which the hard disk is not turned on all the time in order to save power, the saving operation may be deferred until the hard disk has been turned on by another.

EXEMPLARY CONTROL/STATUS INFORMATION

The control strip of the present invention provides a standard screen location for a collection of individual modules that provide status and control functions. In one embodiment, the control strip functions include a network switch that shows whether a network connection for the computer system, such as an AppleTalk™ network connection, is on or off and lets the user turn the network connection on or off without having to locate and execute other network connection software on the computer system (e.g., without having to open the Chooser™).

The control strip may also include a battery monitor that displays the status of the battery or batteries. In one embodiment, the battery monitor displays the current power drain in a manner similar to a car's miles per gallon (MPG) indicator. The needle for the power drain indicator indicates the drain relative to the maximum possible. The control strip of the present invention allows this display to be updated frequently so if the user increased the LCD display screen's brightness level, the needle would animate to denote the consequence of the action.

Another control strip module displays the state of File Sharing (e.g., on, off, or users connected) that may be currently employed on the computer system. The file sharing module also lets the user turn file sharing on or off and lets the user open a control panel to control processing to setup file sharing on the computer system.

The control strip of the present invention may also provide a module to allow the internal hard disk power to be turned off (to save power), and to indicate whether is currently on or off.

The control strip may also provide power settings that allow the user to select between maximum battery conservation or maximum computer performance without opening a control panel. In one embodiment, the power settings portion of the control strip also allow the user to open up the power savings control panel. The control strip of the present invention may also include a function that places the computer in sleep mode or allows the user to select the sound volume.

Other modules, for example, may provide time and/or date information, may list currently running programming applications, may indicate the amount of available memory, may control a CD drive, may provide access to audio controls and status information. Therefore, the control strip acts as a status and control function bar, or windowing area, that provides running modules to be displayed in an arrangement that is to be displayed, such an arrangement being modifiable such that the size of the window or bar may be changed.

Figure 3:
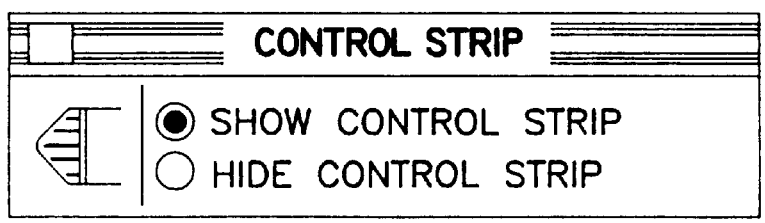
FIG. 3 illustrates one embodiment of the control panel of the present invention.

In one embodiment, the control strip is controllable through a control panel. An exemplary display of such control panel is shown in FIG. 3. Use of control panels is well-known in the art. Using the control panel in FIG. 3, the user is able to hide or show the control strip by clicking the corresponding button in the control panel. Note that in one embodiment, the control panel may also be used to change the font and size of the text in the control strip window.

PROCESSING LOGIC FOR THE PRESENT INVENTION

The present invention includes computer processing logic for generating the control strip of the present invention. This processing logic is described, in part, in the flow charts shown in FIGS. 4–10. In addition to the computer resources described earlier, the present invention relies upon the availability of an operating system and system functions capable of displaying windows, information in windows, characters, and cursor symbols on the display devices. System functions for interfacing with the cursor control devices and cursor function keys, including the tracking of cursor location within a window, are also required. These resources are standard processing components known in the art.

When the processor of the present invention is first powered up, the operating system logic obtains control and initializes the system components such as read/write memory, the display device, the cursor control device, the cursor function keys, and keyboard. During this initialization process or in response to a user command, the operating system displays the control strip of the present invention.

In one embodiment, the control strip initialization is performed in two stages. The first stage begins by initially loading at least one routine at start up. Upon loading necessary routines, the operating system allocates storage for global variables use. Next, resources are loaded for use by the control strip processing logic. These resources include the visual components or indicia that is to appear in the control strip, such as pictures, icons, text, etc. The processing logic for the control strip is patched into the operating system.

Figure 2F:
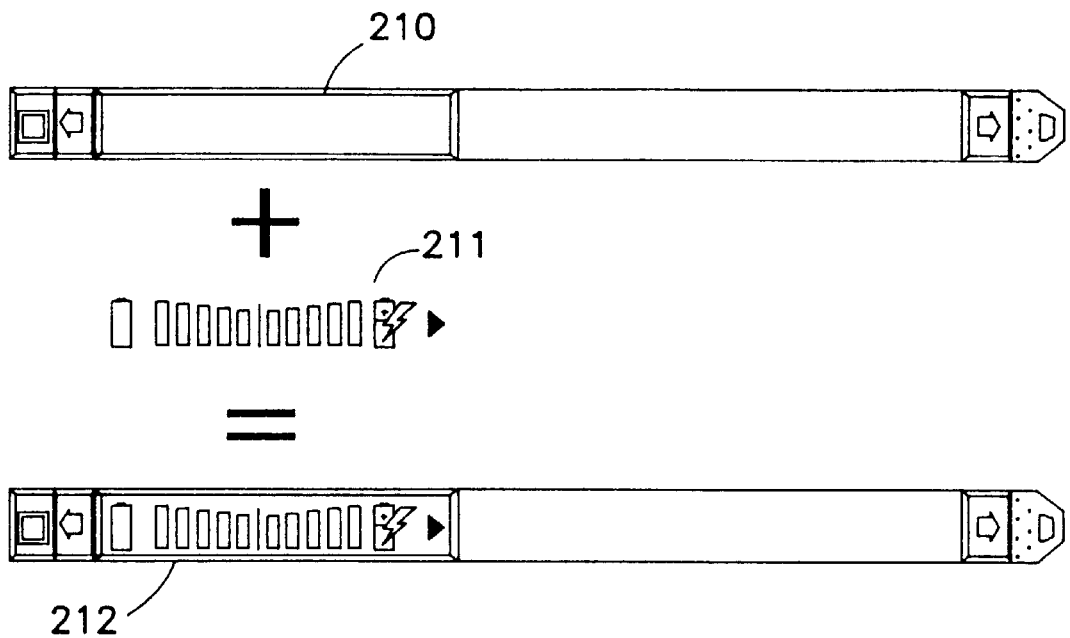
FIG. 2F shows the control strip window graphics generated by processing logic being combined with graphics generated by a module to illustrate the creation of the resulting control strip.

Later, as a second stage of the initialization during the set up process, the control strip processing logic causes each of the module files to be opened one at a time. The code for the module is loaded. An initialization routine is run in response to a call, during which time, the module itself determines if it can run. This information is conveyed to the control strip. The processing logic then causes the window to be displayed and calls the modules to run themselves and appear in the control strip. FIG. 2F shows the control strip window graphics generated by processing logic being combined with graphics generated by a module to illustrate the creation of the resulting control strip.

Figure 4:
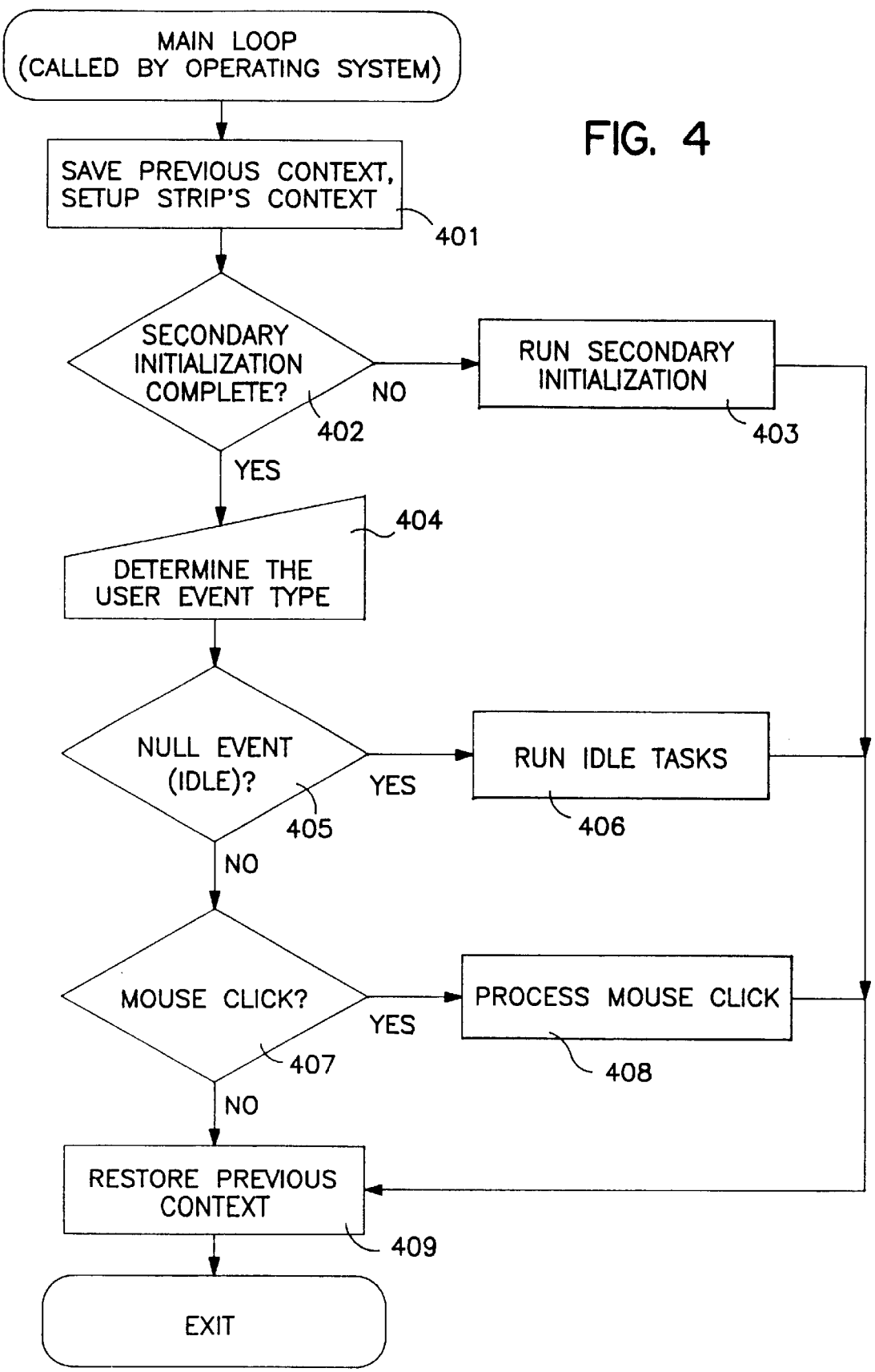
FIG. 4 is a flow chart of one embodiment of the process for the control strip of the present invention.

FIG. 4 is a flowchart of the processing logic responsible for generating the control strip of the present invention and processing events that occur involving the control strip. In one embodiment, the control strip main processing is called by the operating system. Referring to FIG. 4, the processing begins by saving the previous context and sets up the context of the control strip (processing block 401). The previous context refers to the state of the computer system prior to performing control strip processing. The previous context may correspond to an application program running immediately prior to the control strip processing being called. The context may include settings up its memory space, providing access to its global variables, etc.

Next, a test determines if the secondary initialization has been done (processing block 402). If the secondary initialization has not been done, processing continues at processing block 403 where a secondary initialization process is run, and processing thereafter continues at processing block 409. The secondary initialization process causes the processing logic to initialize the control strip. One embodiment of the secondary initialization process is described in FIG. 5. On the other hand, if the window of the control strip is allocated, processing continues at processing block 404 where the processing logic awaits a user event and determines the type of such an event.

Then a test determines if the user event type is a null event (processing block 405). That is, a test determines whether the user event type is idle or not. If the user event type is a null event, processing continues at processing block 406 where idle tasks are run, and processing thereafter continues at processing block 409. Thus, during idle periods, tasks involved with the control strip window may be run as well as tasks of the modules. Examples of module tasks may include updating help messages (e.g., due to a help feature being enabled on the computer system) and saving updated state information (e.g., display area on screen moved to new location, display area resized, module made invisible; module indicates state is changed and that it must be saved). On the other hand, if the event type is not a null event, processing continues at processing block 407.

At processing block 407, a test determines if there has been a "click" of the mouse within the area defined by the control strip. If there has been a click of the mouse within the control strip, the mouse click is processed (processing block 408), and processing continues at processing block 409. The mouse click processing determines the location of the mouse click, which module in the controls strip was selected, or "clicked-on", if any, and any action to be taken based on that location. One embodiment of the mouse click processing is described in FIG. 9. If a mouse click has not occurred within the control strip, processing continues directly to processing block 409.

At processing block 409, the previous context is restored and the processing logic exits to return control to the operating system.

Figure 5:
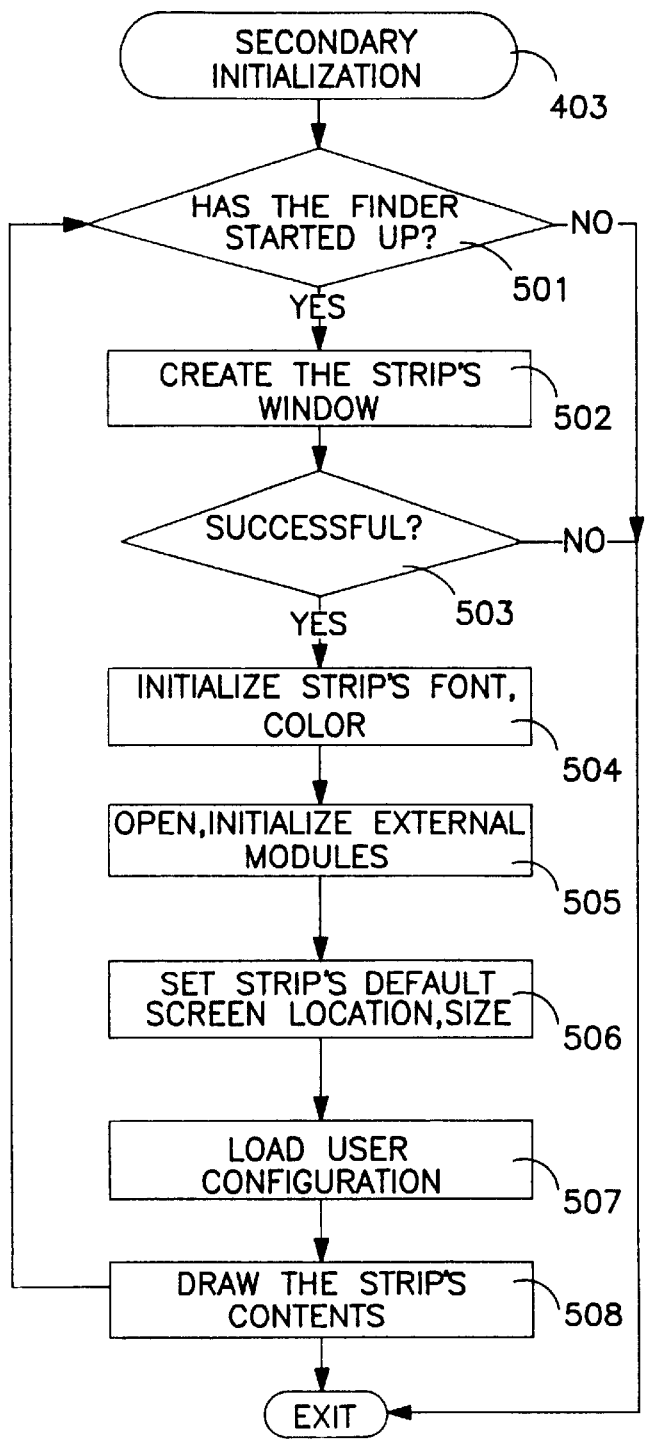
FIG. 5 is a flow chart of one embodiment of the secondary initialization process of the present invention.

One embodiment of the secondary initialization process called by the control strip main processing logic is described in a flowchart in FIG. 5. Referring to FIG. 5, the secondary initialization process begins by testing whether the Finder™ has started up (processing block 501). If the Finder™ has not started up, the secondary initialization process ends. However, if the Finder™ has started up, the window of the control strip is created (processing block 502).

Then a test determines whether the creation of the window of the control strip was successful (processing block 503). If the creation of the window of the control strip was not successful, the process ends. The creation of the window may not be successful because, for instance, there is not enough memory, missing system resources, etc. On the other hand, if the creation of the window of the control strip was successful, the font and color of the control strip are initialized (processing block 504). Then external modules are opened and initialized (processing block 505), the default screen location and size of the control strip are set (processing block 506), the user configuration is loaded (processing block 507), and the contents of the control strip are drawn (processing block 508). The user configuration may include screen location for the control strip, the saved display order of the modules, the window size of the control strip, etc. Then the secondary initialization process ends.

The default screen location and size of the control strip are stored in memory and accessed. In one embodiment, these values may be changed by the computer user, such as by interacting with the control strip itself. In another embodiment, the default values are determined and permanently set by a system designer. Note that specification of the font, color, default screen location and size may not be required in lieu of the user configuration. Likewise, by using solely the default settings, the user configuration is not required.

Figure 6:
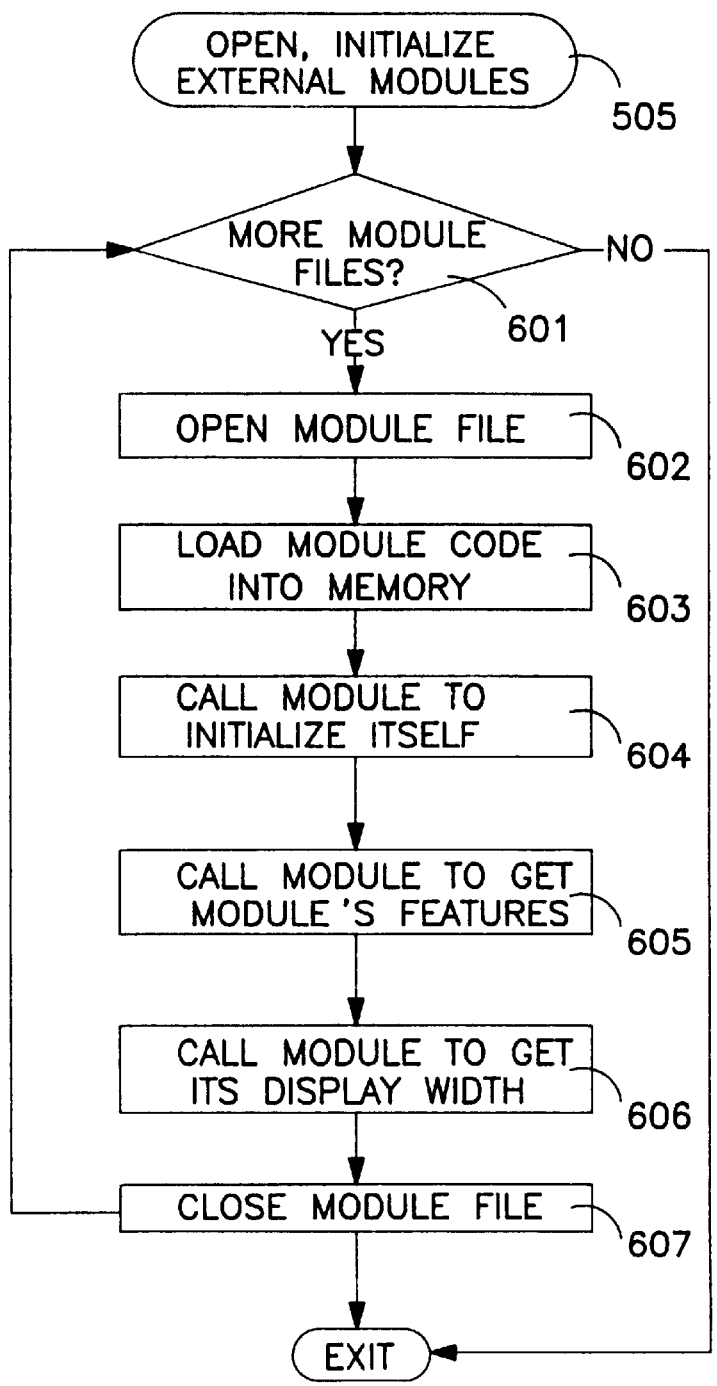
FIG. 6 is a flow chart of one embodiment of the open and initialization process for the external modules of the present invention.

One embodiment of the process for opening and initializing external modules such as may be invoked by the secondary initialization process is shown in FIG. 6. Referring to FIG. 6, the processing logic begins by testing whether there are more module files to be opened (processing block 601). If there are no more module files (e.g., all the modules have been opened and loaded), then the process ends. The modules are opened and initialized one at a time. If there are more module files, the processing logic opens the module file (processing block 602) and loads the module code into memory (processing block 603). The processing logic calls the module to initialize itself (processing 604). The module is then also called by the processing logic to obtain the features of the module (processing block 605) and to obtain the width of the module's area, as well as features of the module (processing block 606). The features of the module include help messages to be displayed when the module is "clicked on" with the cursor. Then the module file is closed (processing block 607) and the processing loops back to processing block 601. By looping back to processing block 601, the processing logic is able to provide the initialization procedures to all the modules, such that when all the modules have been processed the process ends. When the process ends, it returns in a manner well-known in the art to the processing logic that called (e.g., initiated) it.

Figure 7:
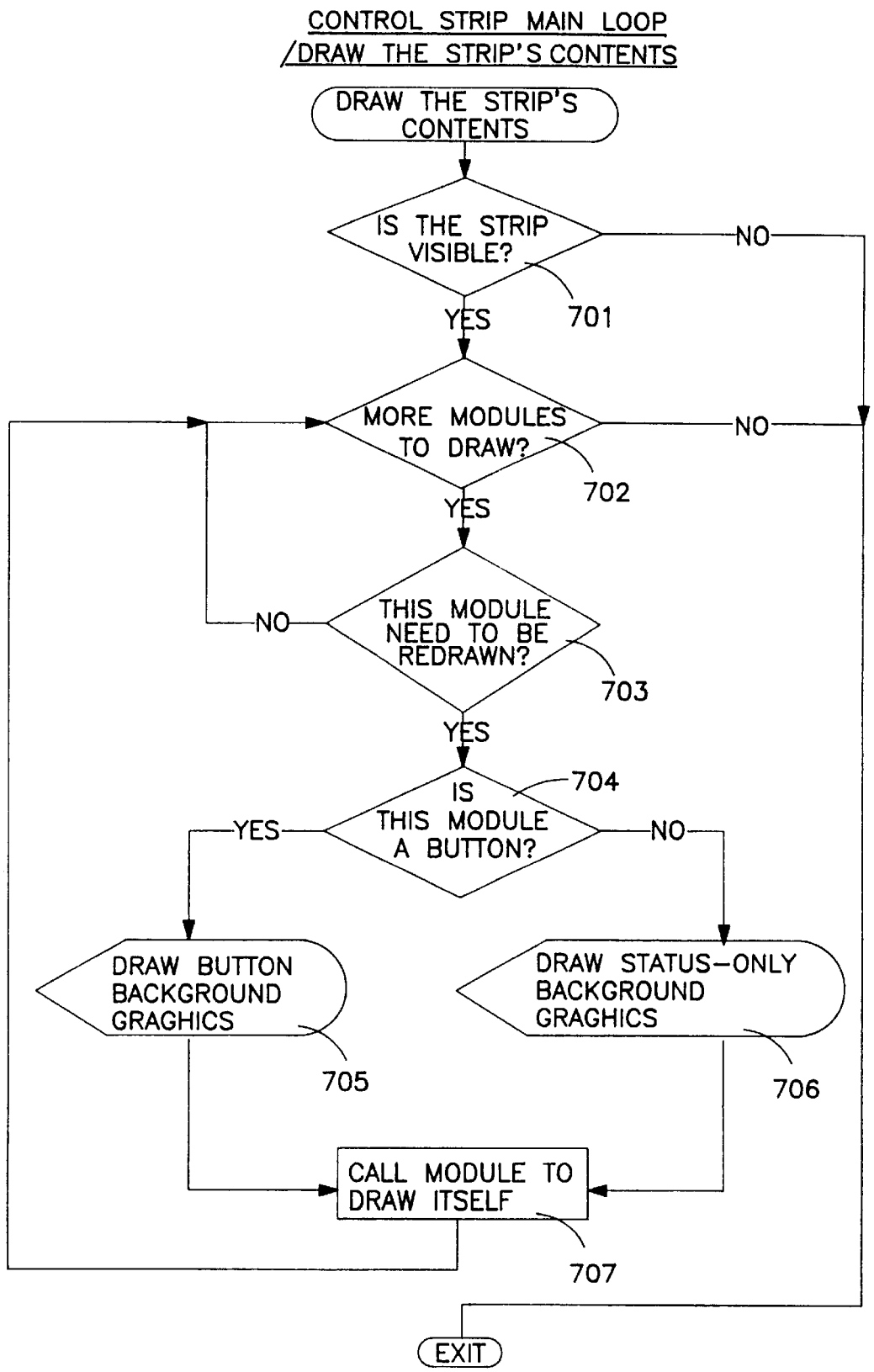
FIG. 7 is a flow chart of one embodiment of the process for drawing the contents of the control strip of the present invention.

One embodiment of a process for drawing the contents of the control strip (processing block 508), such as used at processing block 508 of FIG. 5, is described in FIG. 7. Referring to FIG. 7, the processing logic initially determines if the control strip is visible (processing block 701). If the control strip is not visible, processing ends. That is, if the user has hidden the control strip, the present invention will not draw its contents.

On the other hand, if the control strip is visible, processing continues at processing block 702 enters a looping structure where the processing logic tests whether there are more modules to draw. If there are no more modules to draw, processing ends and control returns to the process that called it. If there are more modules to draw, processing continues at processing block 703 where the processing logic tests whether the particular module needs to be redrawn. A module may need to be drawn when the information being displayed needs to be updated. For example, as the amount of energy in the battery is changing due to energy consumption from the computer system, an update to the battery indicia in the control strip must be made. If the module does not need to be redrawn, processing loops back to processing block 702 where the more modules test is repeated. On the other hand, if the module needs to be redrawn processing continues at processing block 704 where the processing logic determines whether the module is a button. If the module is a button, processing continues at processing block 705 where the background graphics of the button are drawn, and processing continues to processing block 707. If the module is not a button, the status-only background graphics are drawn (processing block 706) and processing continues at processing block 707. Note that in one embodiment, the type of background graphics may be obtained using a message sent to the module requesting its features.

At processing block 707, the processing logic makes a call to the module to draw itself. That is, it is the responsibility of the module itself to draw its status for control indicia. Thereafter processing loops back to processing block 702.

Figure 8:
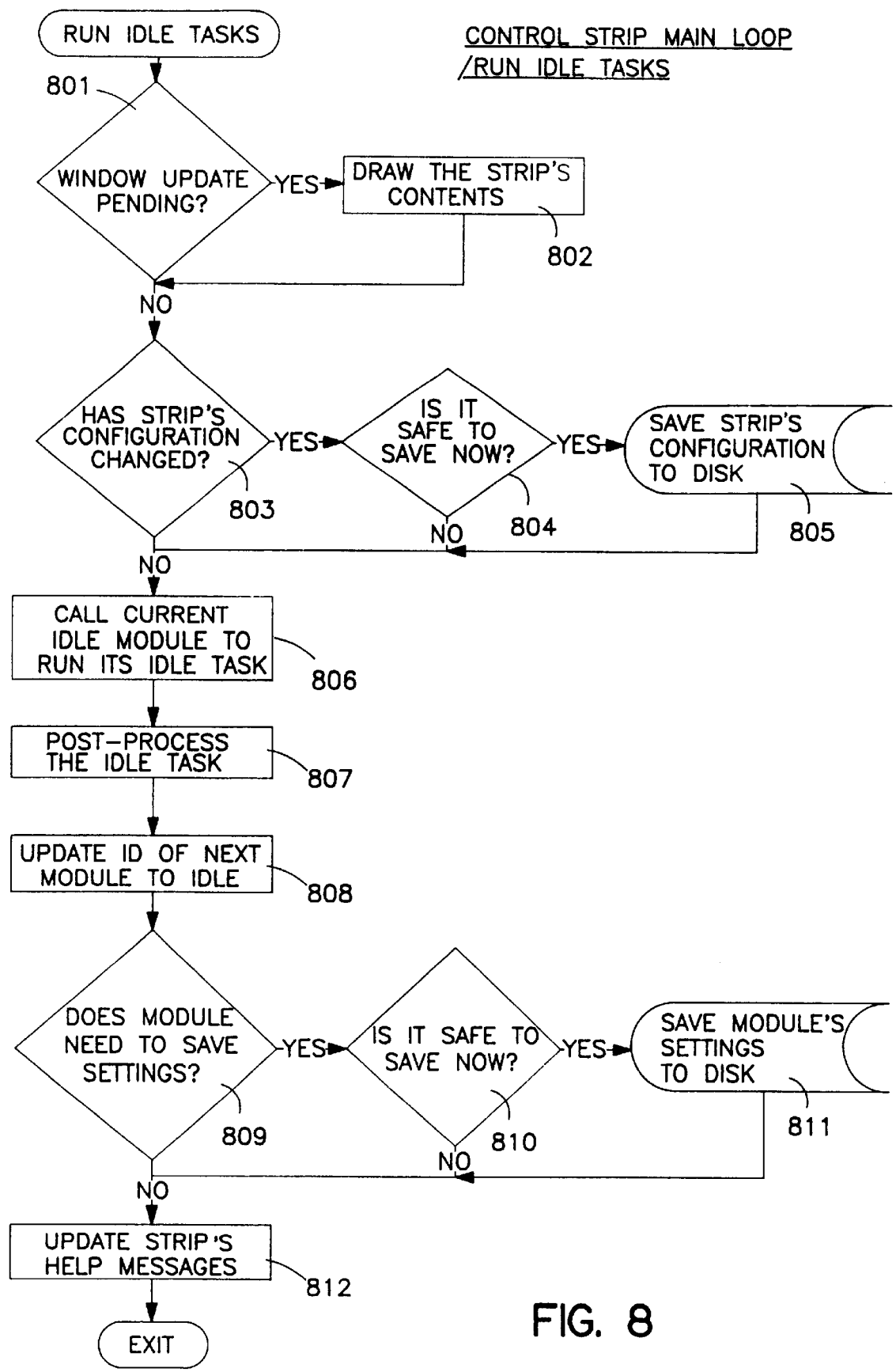
FIG. 8 is a flow chart of one embodiment of the process for running idle tasks in the sent invention.

One embodiment of the processing for running idle tasks in FIG. 4 is described in a flowchart in FIG. 8. Referring to FIG. 8, the processing logic begins by determining whether a window update is pending (processing block 801). If a window update is pending, the processing continues at processing block 802 when the contents of the control strip are drawn. Window updates may be required due to a change in status in one of the modules. Changes may also be due to a reordering of the control strip entries. Note that one embodiment of the process to draw the control strip is shown in FIG. 7. Thereafter processing continues at processing block 803. If a window update is not pending processing continues directly to processing block 803.

At processing 803, processing logic tests whether the configuration of the control strip has changed. If the configuration of the control strip has not changed, processing continues at processing block 806. If the configuration of the control strip has changed, processing continues at processing block 804 where a test determines whether it is safe to perform a save operation. This determination is based on whether the resources are available (i.e., H.D. is turned on) to perform the save operation. If it is not safe to perform a save operation, processing continues at processing block 806. However, if it is safe to save control strip, processing continues at processing block 805 where the configuration of the control strip is saved to disk. Thereafter processing continues to processing block 806.

At processing block 806, the current idle module is called to run its idle task. In one embodiment, the processing logic of the present invention allows only one module to run its idle tasks during each a call to the processing of FIG. 8 (e.g., the currently designated module) to reduce overhead time. Identification of the current module is based on an ID associated with each of the modules.

Figure 10:
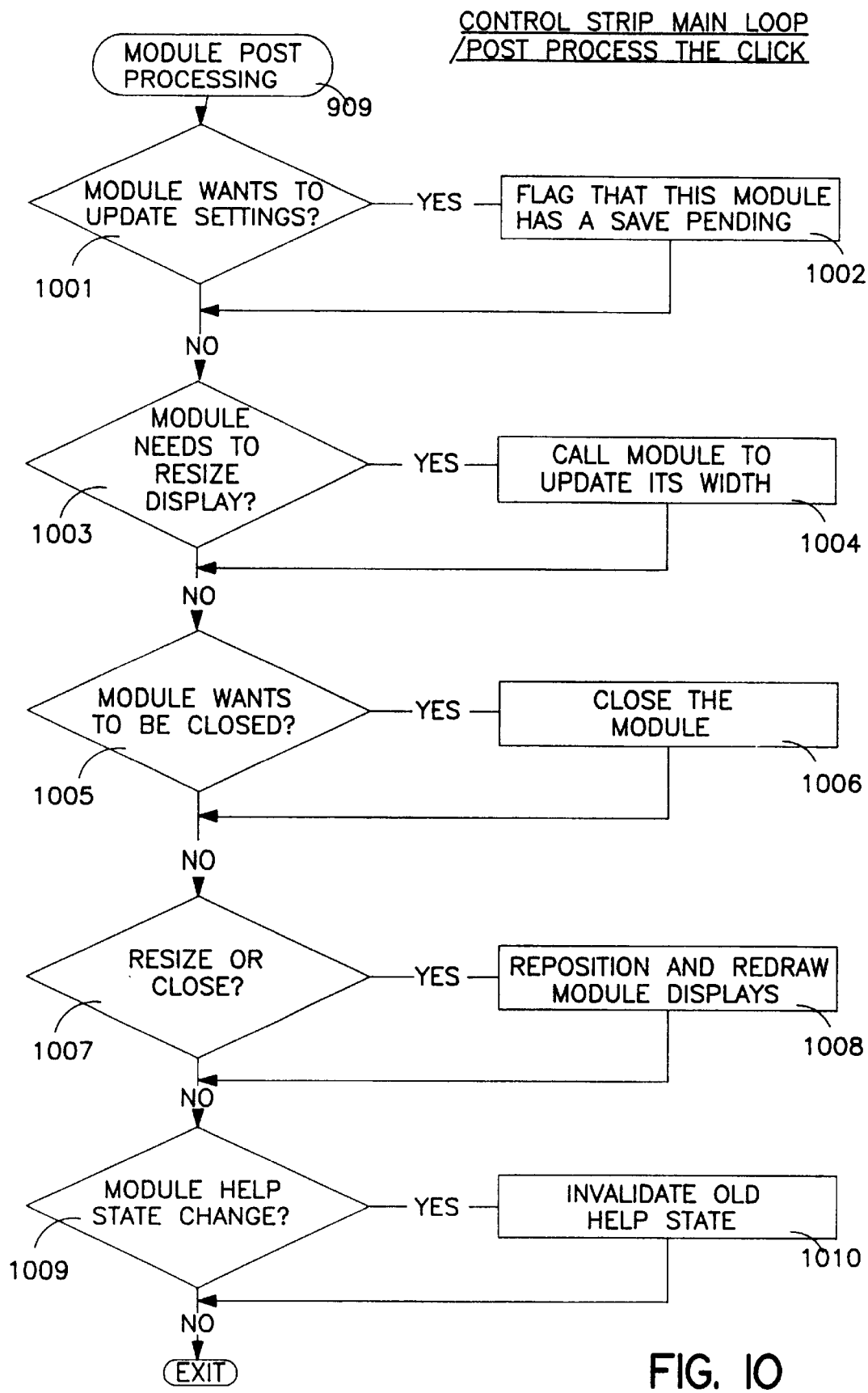
FIG. 10 is a flow chart of one embodiment of the process for post processing a mouse click in the present invention.

Then the idle task undergoes post processing (processing block 807), and the ID of the next module is updated to idle (processing block 808). That is, the module designated as the current module for the next call to the processing of FIG. 8 will be the next module in the list of modules. An example of the post processing is shown in FIG. 10.

Then, the processing logic determines whether the module needs to save settings for use later (processing block 809). If the module does not need to save its settings, processing continues to processing block 812. On the other hand, if the settings of the module are to be saved, the processing logic tests whether the settings may be saved at this time (processing block 810). One reason the settings may not be saved is that the hard disk may be powered down or turned off. If the settings cannot be saved at this time, processing continues at processing block 812. If the settings of the module may be saved at this time, the processing logic causes the module settings to be saved to disk (processing block 811). Thereafter, processing continues at processing block 812.

At processing block 812, the help messages for the control strip are updated, and processing ends and returns to the control of the main processing logic.

Figure 9:
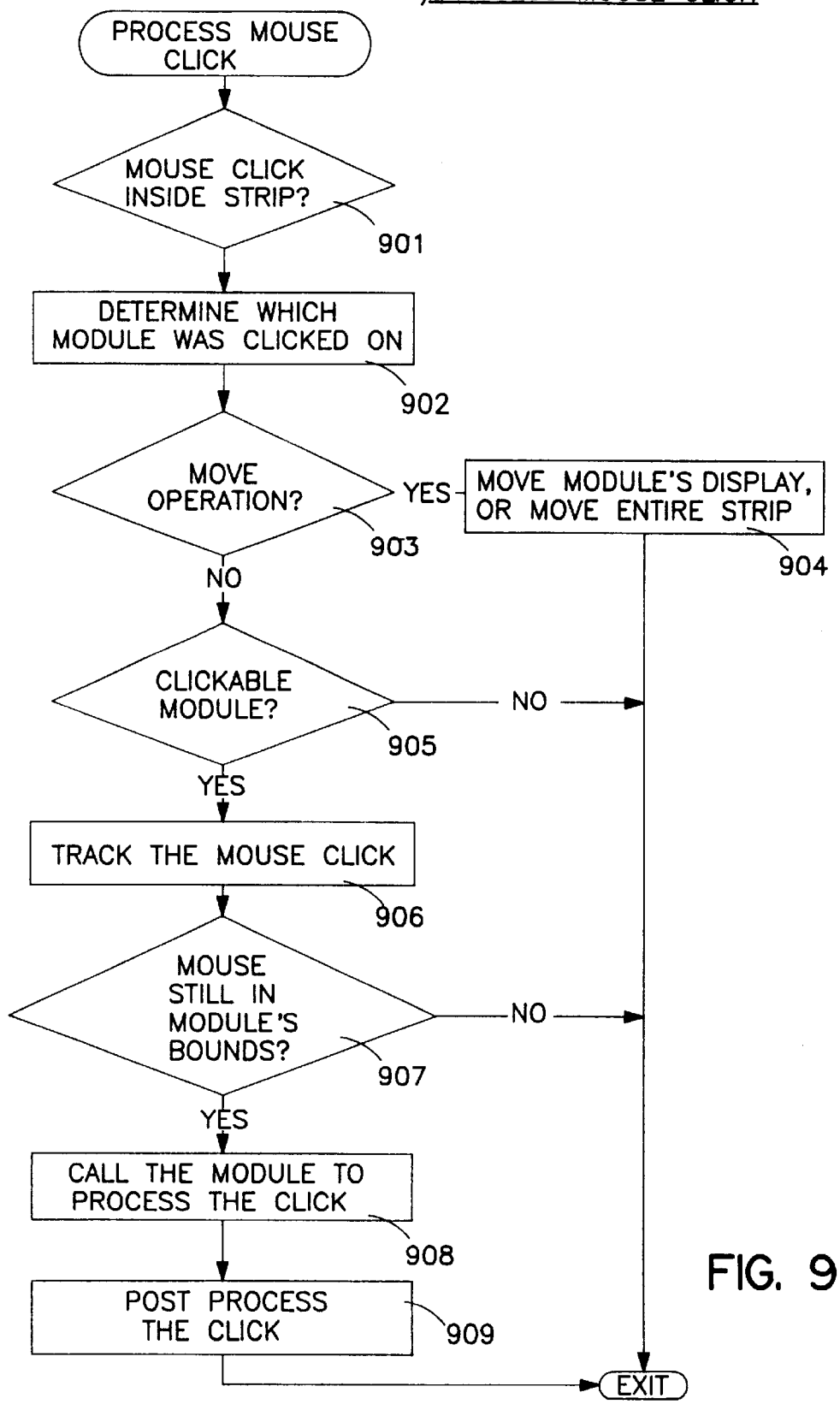
FIG. 9 is a flow chart of one embodiment of the process for responding to a mouse click occurring in the control strip of the present invention.

One embodiment of the mouse click processing of the present invention, such as used in FIG. 4, is shown in a flowchart in FIG. 9. Referring to FIG. 9, the processing logic determines whether a mouse click has occurred inside the control strip (processing block 901). In one embodiment, this determination may be made by comparing the current location of the cursor with the location of the control strip (e.g., status bar). If a mouse click has not occurred inside the control strip, then processing loops back upon itself, retesting repeatedly until a mouse click does occur. When a mouse click occurs within the control strip, processing continues at processing block 902 where a determination is made as to upon which module the cursor was during the click.

The processing logic then determines whether a move operation is being selected by the mouse (processing block 903). If a move operation has been chosen, the display of the module is moved or the entire control strip is moved (processing block 904) and the processing logic ends the mouse click process and exits to control of the processing logic that called this procedure. The determination of whether to move a module or the entire strip is based on the user's keystrokes or mouse movements. On the other hand, if a move operation is not to occur, processing continues at processing block 905.

At processing block 905 the processing logic determines whether the module on which the click occurred is a "clickable" module, as opposed to a status only module, (processing block 905). That is, the processing logic tests whether the module provides any additional functionality when a mouse moves the cursor to select an element in the control strip. If the module is not "clickable," processing ends. If the module is clickable, processing continues to process processing block 906 where the mouse click is tracked, i.e., the location of the cursor.

Next, a test determines if the mouse is still within the bounds of the module (processing block 907). If the mouse is not within the bounds of the module, processing ends. However, if the mouse is within the boundaries of the module, the module is called to process the click (processing block 908) and the click undergoes post processing (processing block 909). Thereafter, the process ends.

One embodiment of the process for post processing the mouse click is shown in FIG. 10. Referring to FIG. 10, the processing logic begins by determining whether the module desires to update its settings (processing block 1001). If the settings for the module are to be updated, processing continues at processing block 1002 where a flag is set to indicate that the module has a save pending, and processing continues to processing block 1003. The settings for a module may have to be updated due to user interaction, such as in the case of an option for a module being turned off or a module acquiring data as part of its functionality. If the settings of a module do not have to be updated, processing continues directly to processing block 1003. Setting may need to be updated when the module is displaying information that is changing frequently.

At processing block 1003, a test determines whether the module needs to resize the display. If the display of the module must be resized, processing continues at processing block 1004 where the module is called to update its width. Then processing continues at processing block 1005. On the other hand, if the display of the module does not need to be resized, processing continues directly to processing block 1005.

At processing block 1005, the processing logic determines whether the module desires to be closed. If the module desires to be closed, processing continues at processing block 1006 where the module is closed immediately. Then processing continues at processing block 1007. If the module does not desire to be closed, processing continues to processing block 1007.

At processing block 1007, a test determines whether the control strip is to be resized or closed. If the control strip needs to be resized or closed, processing continues at processing block 1008 where the module displays are repositioned and redrawn, and then processing continues at processing block 1009. If the control strip is not to be resized or closed, processing continues directly to processing block 1009.

At processing block 1009, a test determines whether the help state of the module is to be changed. The help state refers to help messages that the modules provide to users generally. If the help state of the module is to be changed, processing continues at processing block 1010 where the old help state of the module is invalidated and the process ends. If the module help state does not need to be changed, processing ends. Changes to the help state may occur due to a global change in the computer system, such as when a particular help feature (e.g., help balloons) is enabled.

ADDING CONTROL STRIP MODULES

In one embodiment, the control strip of the present invention operates as a shell with individual control and status modules added. Each module and its icons, pictures, etc., are contained in a file on a disk. The control strip processing logic draws the strip which acts as the background for the individual modules. Each module is responsible for drawing the icons and other objects that make up its user interface.

Contents of Module Files

In one embodiment, the module file includes only a single resource containing the code necessary for the module to interact with the control strip. A module file may contain more than one code resource if it is to provide multifunctional support. In that case, each module in the file is loaded and initialized separately and treated as an independent entity.

Module Interface

The interface of the module to the control strip comprises a code resource. In one embodiment, using the Macintosh™ computer, the type of the code resource is 'sdev'. This code is responsible for performing all of the functions required by the control strip as well as any functions that are custom to the module itself. The module's entry point is at the beginning of the resource and is defined as pascal long ControlStripModule (long message, long params, Rect *statusRect, GraftPtr statusport);

Interactions between a module and the control strip are managed by passing messages to the module to tell it what to do or to obtain information about the module and its capabilities. In one embodiment, each module is required to observe Macintosh™ Pascal register saving conventions; that is, it may trash 680x0 processor registers D0, D1, D2, A0, and A1, but must preserve all other registers across its call. Note that other operating systems and implementations of the present invention may have different restrictions.

The message field comprises a message number from the list in the section "Control Strip Module Messages" that indicates to the module the action to perform.

The params field signifies the result returned by the initialize call to the module. This would typically be a pointer to a pointer (e.g., the handle) to the private variables to be used by the module since modules cannot have global variables. This result is passed to the module on all subsequent calls. Note that in embodiments where modules can have global variables, such a field may be eliminated.

The statusRect field comprises a pointer to a rectangle within the control strip defining the area that a module may draw within.

The statusPort field specifies a pointer to the graphics port of the control strip. The graphics port may be either a color or black-and-white graphics port, and depends on the computer system on which the control strip is running.

The result value returned by the module varies depending on the message sent to it. Results for each message are described below in the sections on the individual messages.

CONTROL STRIP MODULE REFERENCE

In one embodiment, control strip modules interact with the control strip processing logic in three ways: by accepting messages, by calling utility routines, and by calling the operating system manager (e.g., a call to Gestalt selectors). The next three sections describe each of those interactions.

Control Strip Module Messages

In one embodiment, all control strip modules respond to messages from the control strip processing logic, which is responsive to user interaction with the control strip displayed on the screen. The following messages have been defined:

| Message name | Message No. | Description |
| --- | --- | --- |
| sdevInitModule | 0 | Initialize the module |
| sdevCloseModule | 1 | Clean up before being closed |
| sdevFeatures | 2 | Return the feature bits |
| sdevGetDisplayWidth | 3 | Return the current width of the module's display |
| sdevPeriodicTickle | 4 | Periodic tickle when nothing else is happening |
| sdevDrawStatus | 5 | Update the interface in the control strip |
| sdevMouseClick | 6 | User has clicked on the module's display area |
| sdevSavSettings | 7 | Save any changed settings in the module's preferences file |
| sdevShowBalloonHelp | 8 | Display a help balloon, if the module has one | sdevInitModule

The sdevInitModule message is the first message sent to a module after the module has been loaded from its file. Initialization allows the module to initialize its variables and to determine whether it can run on a particular machine. For example, if the function of the module is to display battery information, it may be only able to run on a portable computer, such as the Powerbook manufactured by Apple Computer.

In response to receiving the sdevInitModule message, the module loads and detaches any resources (e.g., text, code, icons, etc.) in its resource file that will be used. Also, space is allocated in the global variables for handles to those detached resources.

The sdevInitModule message returns a result depending on its success at installing itself. In one embodiment, a positive result ($\geq 0$) indicates successful installation. The processing logic passes this result value to the module on all subsequent calls. A negative result indicates an error condition, and installation of the module is aborted by the control strip processing logic. Also if a negative result occurs and installation has been aborted, the module does not receive a close message.

sdevCloseModule

The sDevCloseModule message is sent to a module when it should be closed. In one embodiment, the module itself decides when to be closed. A module may be closed when it no longer is required to be running, such as when a battery level indicator no longer needs to be running when the computer system is receiving its power from an outlet. When the module receives this message, it disposes of all the detached resources it loaded as well as its global storage. No result is expected.

sdevFeatures

The sdevFeatures message queries the module for the features it supports. This message returns as its result a bitmap consisting of 1 bits for supported features and 0 bits for unsupported features. In one embodiment, there are 32 bits returned. All undefined bits are reserved for future features, and, in one embodiment, are set to 0. The bits are defined as:

a) sdevWantMouseClicks (0)—If this bit is set, the control strip notifies the module of mouse down events. If this bit is not set, the control strip assumes that the module only displays status information with no user interaction.

b) sdevDontAutoTrack (1)—If this bit is set, the control strip highlights the display of the module and then calls the module to perform mouse tracking. In one embodiment, this bit is set when, for example, a module has a pop-up menu associated with it. If this bit is cleared, the control strip tracks the cursor until the mouse button is released, then sends an sdevMouseClick message, described below, to the module to notify it that there was a mouse-down event.

c) sdevHasCustomHelp (2)—If this bit is set, the module is responsible for displaying its own help messages. These help messages may be customized depending on its current state. If the bit is cleared, the control strip displays a generic help message when the cursor passes over the its display area and Balloon Help, or other help-based information provider, is on.

d) sdevKeepModuleLocked (3)—If this bit is set, the code of the module is kept locked and protected. In one embodiment, this bit is set only if the module is passing the address of one of its routines to a routine external to the module (e.g., installing itself in a queue).

sdevGetDisplayWidth

The sdevGetDisplayWidth message is sent to a module to determine how much horizontal space (in pixels) its display currently requires on the control strip. In response to the message, the module return the number of pixels as its result. In one embodiment, the returned width does not comprise the maximum width required for any configuration, but instead, reflects how much space it currently requires. Note that this useful because, in one embodiment, its possible for a module to request that its display be resized.

sdevPeriodicTickle

The sdevPeriodicTickle message is passed to the module periodically to allow the module to update its display due to changes in its state. In one embodiment, this message occurs at regular intervals, while in other embodiments, there is no minimum or maximum interval between "tickles." In response to the sdevPeriodicTickle message, the module returns, as its result, some bits that signal requests for actions from the control strip processing logic. In one embodiment, there are 32 bits returned. All undefined bits in the result are reserved for future use and, in one embodiment, are set to 0. The bits are defined as:

a) sdevResizeDisplay (0)—If this bit is set, the module resizes its display. The control strip processing logic sends a sdevGetDisplayWidth message to the module and then updates the control strip on the display.

b) sdevNeedToSave (1)—If this bit is set, the module needs to save changed settings to disk. The control strip processing logic marks the request but may defer the actual save operation to a better time (e.g., when the hard disk is spinning).

c) sdevHelpStateChange (2)—If this bit is set, the help message of the module needs to be updated due to a change in state. If a help balloon is being displayed for the module, the control strip processing logic removes the previous help balloon with a new help balloon for the current state.

d) sdevCloseNow (3)—If this bit is set, the module is requesting to be closed. The control strip processing logic calls the module to save its settings, then calls the module again to close itself by, for example, disposing of any loaded resources, disposing of private storage, etc.

sdevDrawStatus

The sdevDrawStatus message indicates that the module has to redraw its display to reflect the most recent state. In one embodiment, this message is sent when the user clicks on the display area of the module, when any of the display of the module is resized, or when the control strip itself needs to be updated, perhaps in response to a screen saver deactivation.

The statusRect parameter points to a rectangle bounding the display area of the module, in local coordinates. All drawing done by a module within the bounds of the control strip is limited to the module's display rectangle. In other embodiment, drawing may extend outside the display rectange of the module. The clipping region of the control strip's window is set to the visible portion of the display rectangle of the module so that all the elements in the display may be drawn. If the clipping region is to be changed, the initial clipping region should be observed to avoid drawing over other items in the control strip.

sdevMouseClick

When the user clicks in a display area of the module, the control strip processing logic calls the module with the sdevMouseClick message if the sdevWantMouseClicks bit is set in the features of the module.

If the sdevDontAutoTrack bit is also set, the control strip processing logic draws the display of the module in its highlighted state and then sends the sdevMouseClick message to the module. If the sdevDontAutoTrack bit is not set, the control strip processing logic tracks the cursor until the mouse button is released. If the cursor is still within the display area of the module, the control strip processing logic sends the sdevMouseClick message to notify the module that a click occurred. In either case, the module can then perform the appropriate function in response to a mouse-down event.

This message returns the same result as the sdevPeriodicTickle message.

sdevSaveSettings

The sdevSaveSettings message is passed to the module when the control strip processing logic has determined that the configuration information may be saved to the disk (e.g., HD turned on, etc.). In one embodiment, the sdevSaveSettings message is sent only if the module had previously set the sdevNeedToSave bit in the result of a sdevPeriodicTickle or sdevMouseClick message. The call returns an error code (File Manager, Resource Manager, or the like) indicating the success of the save operation. The control strip processing logic continues to send this message to the module until the module returns a result of 0, indicating a successful save.

sdevShowBalloonHelp

The control strip processing logic calls the module with the sdevShowBalloonHelp message if Balloon Help is turned on, the module has previously set the sdevHasCustomHelp bit in its features, and the cursor is over the module's display area. In such a case, the module calls the Help Manager to display a help balloon describing the current state of the module. The module returns a value of 0 if successful or an appropriate error result if not.

UTILITY ROUTINES

In one embodiment, the control strip processing logic provides a set of utility routines that are available to control strip modules. They are provided to promote a consistent user interface within the control strip and to reduce the amount of duplicated code that each module would have to include to support common functions. Therefore, in an embodiment that does not include these utility routines, a portion or all of the modules may include duplicated code supporting common functions.

SBIsControlStripVisible

The SBIsControlStripVisible routine determines whether the control strip is visible. An exemplary call follows:

pascal Boolean SBIsControlStripVisible ( );

The SBIsControlStripVisible routine returns a Boolean value indicating whether or not the control strip is currently visible. It returns a value of "true" if the control strip is visible, or a value of "false" if it's hidden.

In one embodiment, the SBIsControlStripVisible call returns a value of "true" even when the control strip is not visible. That happens whenever the control strip is not accessible in the current environment. As soon as that condition changes, the control strip becomes visible again and the returned value correctly reflects the actual state.

SBShowHideControlStrip

The SBShowHideControlStrip routine shows or hides the control strip. An exemplary call follows:

pascal void SBShowHideControlStrip (Boolean showIt);

The SBShowHideControlStrip routine determines the visibility state for the control strip based on the value of the "showIt" parameter. Passing a value of "true" makes the control strip visible, and passing a value of "false" hides it. Modules may not need to call this routine. However, the SBShowHideControlStrip routine provides a means for other software to hide the control strip when it is in the way.

Calling the SBShowHideControlStrip routine with a "showIt" value of "true" may or may not show the control strip, depending on the current environment. If the control strip is not accessible, it does not become visible. If a "showIt" value of "true" is passed to this routine, then the control strip becomes visible when the environment changes.

SBSafeToAccessStartupDisk

The SBSafeToAccessStartupDisk routine determines whether the internal hard disk is turned on so that processing logic of the present invention can determine whether to make a disk access or postpone it until a time when the disk is already spinning. An exemplary call follows:

pascal Boolean SBSafeToAccesStartupDisk ( );

The SBSafeToAccessStartDisk routine returns a Boolean value of "true" if the disk is turned on and "false" if it is not.

SBOpenModuleResourceFile

The SBOpenModuleResourceFile routine opens a module resource file. An examplary call follows:

pascal short SBOpenModuleResourcFile (OSType fileCreator);

The SBOpenModuleResourceFile routine opens the resource fork of the module file whose creator is "fileCreator", and return the file's reference number as its result. If the file cannot be found or opened, the SBOpenMduleResourceFile routine returns a result of −1.

The SBOpenModuleResourceFile routine also provides a means for a module to load in large or infrequently used resources that it doesn't usually need, but that it requires for a particular operation.

SBLoadPreferences

The SBLoadPreferences routine loads a resource from a preferences file. An examplary call follows:

pascal OSErr SBLoadPreferences (ConstStr255Param prefsResourceName, Handle *preferences);

The SBLoadPreferences routine loads a resource containing a module's configuration information from the preferences file of the control strip. The PrefsResourceName parameter points to a Pascal string containing the name of the resource. The "Preferences" parameter points to a variable that holds a handle to the resource read from the file. The handle does not need to be preallocated.

If either prefsResourceName or preferences contains a nil pointer, the SBLoadPreferences routine does nothing and returns a result of paramErr. If the resource is successfully loaded, the SBLoadPreferences routine returns a result of 0. The SBLoadPreferences routine also returns other Memory Manager and Resource Manager errors if it fails during some art of the process.

SBSavePreferences

The SBSavePreferences routine saves a resource to a preferences file. An exemplary call follows:

pascal OSErr SBSavePreferences (ConstStr255Param prefsResourceName, Handle preferences);

The SBSavePreferences routine saves a resource containing a module's configuration information to the preferences file of the control strip. The PrefsResourceName parameter points to a Pascal string containing the name of the resource. The "preferences" parameter contains a handle to a block of data which will be written to the file.

If either prefsResourceName or preferences has a nil value, the SBSavePreferences routine does nothing and returns a result of paramErr. if the resource is successfully saved, the SBSavePreferences routine returns a result of 0. The SBSavePreferences routine can also return other Memory Manager and Resource Manager errors if it fails during some part of the process.

SBGetDetachedString

The SBGetDetachedIndString routine obtains a string from a detached resource. An exemplary call follows:

pascal void SBGetDetachedIndString (StringPtr the String, Handle stringList, short whichString);

The SBGetDetachedIndString routine is the detached resource version of GetIndString. The parameter thestring points to a Pascal string; the stringList is a handle to a detached 'STR#' resource; and whichString is the index (1–n) into the array of Pascal strings contained in the detached resource. The SBGetDetachedIndString routine copies the string whose index is whichString into the space pointed to by theString. If whichString is out of range, the SBGetDetachedIndString routine returns a zero-length string.

SBGetDetachIconSuite

The SBGetDetachIconSuite routine sets up a detached icon suite. An exemplary call follows:

pascal OSErr SBGetDetachIconSuite (Handle *theIconSuite, short theResID, unsigned long selector);

The SBGetDetachIconSuite routine creates a new icon suite, loads all of the requested icons, and then detaches the icons. The parameter theIconSuite points to the location where the handle to the icon suite is stored; the parameter theResID is the resource ID of the icons that make up the icon suite; and the parameter "selector" indicates which icons are to be loaded into the suite. In one embodiment, the "selector" parameter contains one (or a combination of) the following values:

| svAllLargeData | 0x000000FF | load large 32-by-32-pixel icons ('ICN#', 'ic14', 'ic18') |
|---|---|---|
| svAllSmallData | x0000FF00 | load small 16-by-16-pixel icons ('ics#', 'ics4', 'ics8') |
| svAllMiniData | 0x00FF0000 | load mini 12-by-12-pixel icons ('icm#', icm4', 'icm8') |

These values may be ORed together to load combinations of icon sizes. The SBGetDetachIconSuite routine returns an appropriate error code if it's unsuccessful, or 0 if it was able to load the icon suite. Note that if none of the icons comprising the icon suite could be found, the call returns the error "resNotFound. In one embodiment, the SBGetDetachIconSuite routine is called only when the resource file of the module is open. This is typically the case during a module's initialization call.

SBTrackpopupMenu

The SBTrackpopupMenu routine manages a pop-up menu. An exemplary call follows:

pascal short SBTrackpopupMenu (const Rect *moduleRect, MenuHandle theMenu);

The SBTrackpopupMenu routine handles setting up and displaying a pop-up menu associated with a module. The module passes a pointer to its display rectangle and a handle to the menu to use. In one embodiment the menu is displayed immediately above and adjacent to the display rectangle of the module, yet this is not required. By doing so, the user is allowed to view the current configuration or to change the settings. The SBTrackpopupMenu routine returns an indication as to which menu item was selected, or 0 if no item was selected (e.g., because the user moved the cursor outside the menu's bounds).

SBTrackSlider

The SBTrackSlider routine displays and sets an arbitrary parameter. An exemplary call follows:

pascal short SBTrackSlider (const Rect *moduleRect, short ticksOnSlider, short initialValue);

The SBTrackSlider routine displays an unlabeled slider above the module's display rectangle. The slider may be used for displaying and setting the state of an arbitrary parameter. The parameter "ModuleRect" contains a pointer to the module's display rectangle; "ticksOnSlider' is the upper bounds of the value returned by the slider; and "initialValue" is the starting position (0 to ticksOnSlider −1). When the user releases the mouse button, the SBTrackSlider routine returns the final position.

SBShowHelpString

The SBShowHelpString routine displays a help balloon. An exemplary call follows:

pascal OSErr SBShowHelpString (const Rect *moduleRect, StringPtr helpstring);

The SBShowHelpString routine displays a module's help balloon. The module passes a pointer to its display rectangle and a pointer to a Pascal string, and the routine displays the balloon if possible. If the help dstring has a length of 0 or the Help Manager is unable to display a balloon, an error result is returned. If the SBShowHelpString routine successfully displays the help balloon, it returns a result of 0.

SBGetBarGraphWidth

The SBGetBarGraphWidth routine determines how wide a bar graph drawn by the SBDrawBarGraph routine (described below) will be so that a module can calculate its display width. An exemplary call follows:

pascal short SBGetBarGraphWidth (short barCount);

The SBGetBarGraphWidth routine returns the width of a bar graph containing barCount segments. If barCount has a value less than 0, the SBGetBarGraphWidth routine returns a width of 0.

SBDrawBarGraph

The SBDrawBarGraph routine draw as bar graph. An exemplary call follows below:

pascal void SBDrawBarGraph (short level, short barCount, short direction, Point barGraphTopLeft);

The SBDrawBarGraph routine draws a bar graph containing the number of segments specified by the barCount parameter in a module's display area. If the value of barCount is less than or equal to 0, the SBDrawBarGraph routine does nothing.

Figure 11:
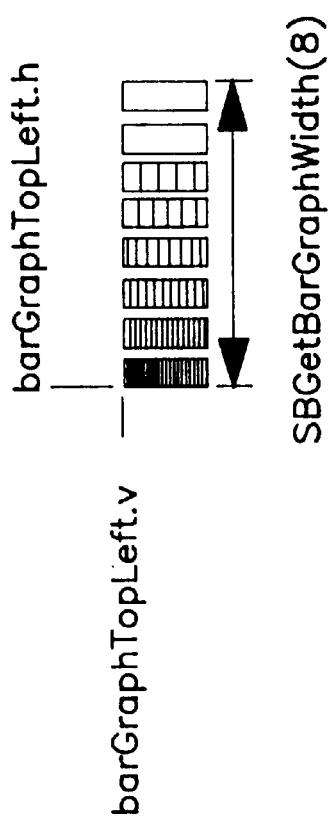
FIG. 11 illustrates a bar graph for display in a data display area in the control strip of the present invention.

The bar graph is drawn relative to the location specified by barGraphTopLeft. FIG. 11 illustrates the manner in which the point barGraphTopLeft determines the position of the bar graph.

The "level" parameter determines how many segments are highlighted. The value of "level" should be in the range of 0 to barCount −1. If the value of "level" is less than 0, no segments in the bar graph are highlighted; if "level" is greater than or equal to barCount, all segments in the bar graph are highlighted.

Figure 12:
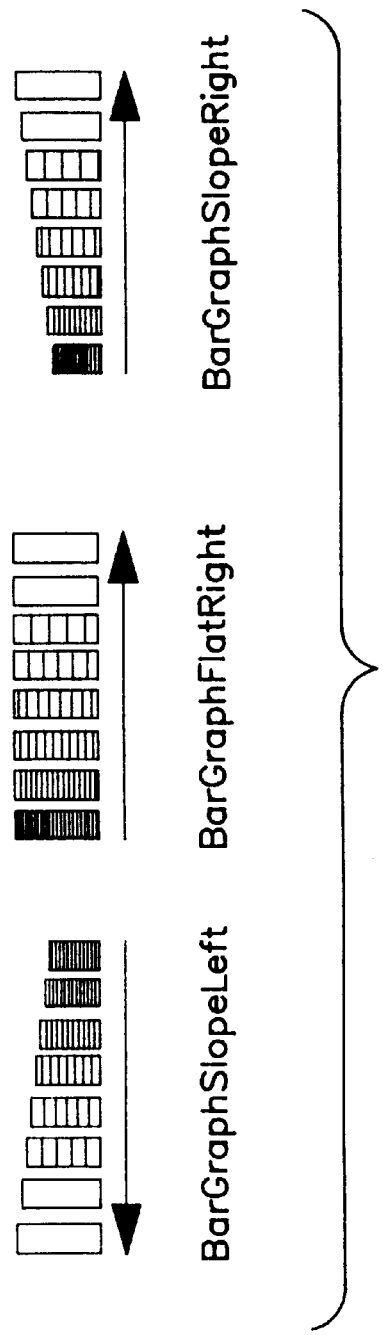
FIG. 12 illustrates a bar graph that results after using arrow direction icons.

The direction parameter specifies which way the bar graph will be drawn to show a larger level. In one embodiment, the direction parameter specifies one of the following values:

define BarGraphSlopeLeft −1 //max end of sloping graph is on the left #define BarGraphFlatRight 0 //max end of flat graph is on the right #define BarGraphSlopeRight 1 //max end of sloping graph is on the right FIG. 12 illustrates the resulting bar graph for each direction value. The arrows indicate which way an increasing level value is displayed. In one embodiment, for sloped versions of the bar graph, the number of segments specified by the barCount value may not be larger than 8. If a larger barCount value is passed, the SBDrawBarGraph routine draws nothing.

SBModalDialogInContext

The SBModalDialogInContext routine may be used in place of the ModalDialog routine to prevent background applications from being run while the modal dialog window is visible. An exemplary call is as follows:

pascal void SBModalDialogInContext (ModalFilterProcPtr filterProc, short *itemHit);

The SBModalDialogInContext routine is a special version of ModalDialog that doesn't allow background applications to be run while a modal dialog window is visible. The SBModalDialogInContext routine is used when the occurence of context switching is not desired.

GESTALT SELECTOR

The control strip processing logic installs two "Gestalt" selectors to return information to locations external to the computer system. One selector returns software attributes, and the other returns the current version of the processing logic (e.g., software).

gestaltControlStripAttr

The selector "gestaltControlStripAttr ('sdev') return 32 bits describing the attributes of the current version of the control strip processing logic. In one embodiment, only the following bit is defined:

gestaltControlStripExists 0 1=control strip is installed
gestaltControlStripVersion The selector gestaltControlStripVersion ('csvr') returns the version of control strip processing logic that is installed. The format of the returned version is the same as that of the numeric part of a Macintosh™ computer system resource, that is:

| Bits 31–24 | Major part of the version, in BCD |
|---|---|
| Bits 23–20 | Minor part of the version, in BCD |
| Bits 19–16 | Bug release version, in BCD |
| Bits 15–8 | Release stage: |
| | $80=final |
| | $60=beta |
| | $40=alpha |
| | $20=development |
| Bits 7–0 | Revision level of nonreleased version, in binary |

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for generating a window displaying control and status indicia has been described.

I claim:

1. An interactive computer-controlled display system comprising:

a processor;

a data display screen coupled to the processor;

a cursor control device coupled to said processor for positioning a cursor on said data display screen;

a window generation and control logic coupled to the processor and data display screen to create an operating environment for a plurality of individual programming modules associated with different application programs that provide status and/or control functions, wherein the window generation and control logic generates and displays a first window region having a plurality of display areas on said data display screen, wherein the first window region is independently displayed and independently active of any application program, and wherein each of the plurality of display areas is associated with one of the plurality of individual programming modules, the first window region and the plurality of independent display areas implemented in a window layer that appears on top of application programming windows that may be generated; and an indicia generation logic coupled to the data display screen to execute at least one of the plurality of individual programming modules to generate information for display in one of the plurality of display areas in the first window region, wherein at least one of the plurality of display areas and its associated programming module is sensitive to user input, and further wherein the window generation and control logic and the indicia generation logic use message-based communication to exchange information to coordinate activities of the indicia generation logic to enable interactive display activity.

2. The display system defined in claim 1 wherein the first window region comprises a control strip.

3. The display system defined in claim 1 wherein said at least one display area is variably sized.

4. The display system defined in claim 1 wherein size of the first window region is variable.

5. The display system defined in claim 4 wherein the first window region is sized such that none of the plurality of display areas is visible.

6. The display system defined in claim 4 wherein the first window region is sized such that all of the plurality of display areas are visible.

7. The display system defined in claim 4 wherein the first window region is sized such that a portion of the plurality of display areas is visible.

8. The display system defined in claim 1 wherein at least one of the plurality of the display areas only displays information.

9. The display system defined in claim 1 wherein at least one of the display areas acts to provide access to control information when selected.

10. The display system defined in claim 9 wherein said at least one of the plurality of display areas displays an additional display element.

11. The display system defined in claim 1 wherein each of the plurality of display areas is individually and variably sized.

12. The display system defined in claim 1 wherein the first window region always appears in front of application windows.

13. The display system defined in claim 1 wherein the first window region is implemented in a private window layer that appears in front of windows for all applications layers.

14. An interactive computer-controlled display system comprising:

a processor;

a data display screen coupled to the processor;

a cursor control device coupled to said processor for positioning a cursor on said data display screen;

window generation and control logic coupled to the processor and data display screen to create an operating environment for a plurality of individual programming modules associated with different application programs that provide status and/or control functions, wherein the window generation and control logic generates and displays a first window-region having a plurality of display areas on said data display screen, wherein the first window region is independently displayed and independently active of any application program, and wherein each of the plurality of display areas is associated with one of the plurality of individual programming modules, the first window region and the plurality of independent display areas implemented in a window layer that appears on top of application programming windows that may be generated; and at least one indicia graphics generation logic coupled to the processor and the window generation and control logic, wherein said at least one indicia graphics generation logic generates user sensitive graphics for display in at least one data display area by executing at least one of the plurality of individual programming modules;

wherein the window generation and control logic determines when said at least one data display area has been selected by the user and signals said at least one indicia graphics generation logic in response to user selection, and further wherein said at least one indicia graphics generation logic initiates a response from said at least one of the plurality of programming modules.

15. The display system defined in claim 14 wherein the first window region is always visible to the user.

16. The display system defined in claim 14 wherein the first window region comprises a control strip.

17. The display system defined in claim 14 wherein said at least one display area is variably sized.

18. The display system defined in claim 14 wherein each of the plurality of display areas is individually and variably sized.

19. The display system defined in claim 14 wherein the first window region always appears in front of application windows.

20. The display system defined in claim 14 wherein the first window region is implemented in a private window layer that appears in front of windows for all applications layers.

21. A method for generating control information comprising:

creating an operating environment for a plurality of individual programming modules associated with different application programs that provide status and/or control functions;

generating a first window sized to accommodate a plurality of display areas for indicia resulting from executing at least one of the plurality of individual programming modules, wherein each of the plurality of display areas is associated with one of the plurality of individual programming modules, and wherein the first window is independently displayed and independently active of any application program, the first window region and the plurality of independent display areas implemented in a window layer that appears on top of application programming windows that may be generated;

displaying the indicia in each of said plurality of display areas by executing one of a plurality of individual programming modules corresponding to each indicia;

selecting one of the indicia, wherein the selecting comprises a first programming module determining which of said plurality of display areas is selected and sending a message to a programming module of said plurality of individual programming modules responsible for generating a display of a selected indicia;

said programming module performing a function in response to a selection.

22. The method defined in claim 21 wherein one of said plurality of indicia comprises status information.

23. The method defined in claim 21 wherein one of said plurality of indicia comprises control information.

24. The method defined in claim 21 further comprising:

the first programming module requesting a set of features supported by said programming module, wherein said requesting comprises sending a first message to said programming module; and said programming module returning a second message indicative of features supported by said programming module, such that said first programming module interacts with said programming module in response to user interaction with the first programming module based on indicated features as set forth by said programming module.

25. A system comprising:

a window generation and control logic to create an operating environment for a plurality of individual programming modules associated with different application programs that provide status and/or control functions, wherein the window generation and control logic generates and displays a first window region having a plurality of display areas, wherein the first window region is independently displayed and independently active of any application program, and wherein each of the plurality of display areas is associated with one of the plurality of individual programming modules, the first window region and the plurality of independent display areas implemented in a window layer that appears on top of application programming windows that may be generated;

an indicia generation logic coupled to the data display screen to execute at least one of the plurality of individual programming modules to generate information for display in one of the plurality of display areas in the first window region, wherein at least one of the plurality of display areas and its associated programming module is sensitive to user input, and further wherein the window generation and control logic and the indicia generation logic use message-based communication to exchange information to coordinate activities of the indicia generation logic to enable interactive display activity.

26. An interactive computer-controlled display system comprising:
a means for positioning a cursor on a data display screen;
a means for creating an operating environment for a plurality of individual programming modules associated with different application programs that provide status and/or control functions, wherein a first window region is displayed having a plurality of display areas on said data display screen, wherein the first window region is independently displayed and independently active of any application program, and wherein each of the plurality of display areas is associated with one of the plurality of individual programming modules, the first window region and the plurality of independent display areas implemented in a window layer that appears on top of application programming windows that may be generated; and
a means for executing at least one of the plurality of individual programming modules to generate information for display in one of the plurality of display areas in the first window region, wherein at least one of the plurality of display areas and its associated programming module is-sensitive to user input, wherein an interactive display activity is enabled.

27. The display system defined in claim 26 wherein the first window region comprises a control strip.

28. The display system defined in claim 26 wherein said at least one of the plurality of display areas is variably sized.

29. The display system defined in claim 26 wherein size of the first window region is variable.

30. The display system defined in claim 29 wherein the first window region is sized such that none of the plurality of display areas is visible.

31. The display system defined in claim 29 wherein the first window regions is sized such that all of the plurality of display areas are visible.

32. The display system defined in claim 29 wherein the first window regions is sized such that a portion of the plurality of display areas is visible.

33. The display system defined in claim 26 wherein said at least one of the plurality of display areas only displays information.

34. The display system defined in claim 26 wherein said at least one of the plurality of display areas acts to provide access to control information when selected.

35. The display system defined in claim 34 wherein said at least one of the data areas display an additional display element.

36. The display system defined in claim 26 wherein each of the plurality of display areas is individually and variably sized.

37. The display system defined in claim 26 wherein the first window region always appears in front of application windows.

38. The display system defined in claim 26 wherein the first window region is implemented in a private window layer that appears in front of windows for all application layers.

39. An interactive computer-controlled display system comprising:
a means for positioning a cursor on said data display screen;
a means for creating an operating environment for a plurality of individual programming modules associated with different application programs that provide status and/or control functions, wherein a first window region is displayed having a plurality of display areas on said data display screen, wherein the first window region is independently displayed and independently active of any application program, and wherein each of the plurality of display areas is associated with one of the plurality of individual programming modules, the first window region and the plurality of independent display areas implemented in a window layer that appears on top of application programming windows that may be generated;
a means for generating user sensitive graphics for display in at least one data display area;
a means for determining when said at least one data display area has been selected by the user; and
a means for initiating a response from said at least one of the plurality of programming modules.

40. The display system defined in claim 39 wherein the first window region is always visible to the user.

41. The display system defined in claim 39 wherein the first window region comprises a control strip.

42. The display system defined in claim 39 wherein said at least one data display area is variably sized.

43. The display system defined in claim 39 wherein each of the plurality of display areas is individually and variably sized.

44. The display system defined in claim 39 wherein the first window region always appears in front of application windows.

45. The display system defined in claim 39 wherein the first window region is implemented in a private window layer that appears in front of windows for all applications layers.

46. A computer readable medium containing executable computer program instructions, which when executed by a data processing system, cause the data processing system to perform a method for generating control information comprising:
creating an operating environment for a plurality of individual programming modules associated with different application programs that provide status and/or control functions;
generating a first window sized to accommodate a plurality of display areas for indicia resulting from executing at least one of the plurality of individual programming modules, wherein each of the plurality of display areas is associated with one of the plurality of individual programming modules, and wherein the first window is independently displayed and independently active of any application program, the first window region and the plurality of independent display areas implemented in a window layer that appears on top of application programming windows that may be generated;
displaying the indicia in each of the plurality of display areas by executing one of a plurality of individual programming modules corresponding to each indicia; and
selecting one of the indicia, wherein the selecting comprises a first programming module determining which of the plurality of display areas is selected and sending a message to a programming module of the plurality of individual programming modules responsible for generating a display of a selected indicia, and the programming module performing a function in response to a selection.

47. The computer readable medium as set forth in claim 46 wherein ones of the indicia comprises status information.

48. The computer readable medium as set forth in claim 46 wherein one of the indicia comprises control information.

49. The computer readable medium as set forth in claim 46 further comprising:

the first programming module requesting a set of features supported by said programming module, wherein requesting comprises sending a first message to said programming module; and said programming module returning a second message indicative of features supported by said programming module, such that said first programming module interacts with said programming module in response to user interaction with the first programming module based on indicated features as set forth by said programming module.

50. A system comprising:

a means for window generation and control to create an operating environment for a plurality of individual programming modules associated with different application programs that provide status and/or control functions, wherein the means for window generation and control generates and displays a first window region having a plurality of display areas, wherein the first window region is independently displayed and independently active of any application program, and wherein each of the plurality of display areas is associated with one of the plurality of individual programming modules, the first window region and the plurality of independent display areas implemented in a window layer that appears on top of application programming windows that may be generated;

a means for indicia generation coupled to the data display screen to execute at least one of the plurality of individual programming modules to generate information for display in one of the plurality of display areas in the first window region, wherein at least one of the plurality of display areas and its associated programming module is sensitive to user input, and further wherein the means for window generation and control and the means for indicia generation use message-based communication to exchange information to coordinate activities of the means for indicia generation to enable interactive display activity.

* * * * *